(12) United States Patent
Fukuhara

(10) Patent No.: US 8,763,538 B2
(45) Date of Patent: Jul. 1, 2014

(54) FOLDING TABLE

(75) Inventor: Koji Fukuhara, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 130 days.

(21) Appl. No.: 13/500,099

(22) PCT Filed: Sep. 24, 2010

(86) PCT No.: PCT/JP2010/066503
§ 371 (c)(1),
(2), (4) Date: Apr. 4, 2012

(87) PCT Pub. No.: WO2011/043200
PCT Pub. Date: Apr. 14, 2011

(65) Prior Publication Data
US 2012/0204771 A1    Aug. 16, 2012

(30) Foreign Application Priority Data

Oct. 7, 2009   (JP) .................................. 2009-233672

(51) Int. Cl.
A47B 1/04    (2006.01)
(52) U.S. Cl.
USPC ........................................... 108/77; 297/173
(58) Field of Classification Search
USPC ............... 297/173; 108/77, 78, 79, 80, 81, 82
See application file for complete search history.

(56) References Cited

U.S. PATENT DOCUMENTS

| | | | | |
|---|---|---|---|---|
| 190,717 A | * | 5/1877 | Hull ................................ | 108/77 |
| 2,358,174 A | * | 9/1944 | McFall ........................... | 108/77 |
| 3,177,824 A | * | 4/1965 | Onishi ............................ | 108/77 |
| 4,446,796 A | * | 5/1984 | Wilson et al. .................. | 108/69 |
| 4,475,267 A | * | 10/1984 | Hathaway .................. | 248/240.2 |
| 4,836,114 A | * | 6/1989 | Cohen et al. .................... | 108/77 |
| 4,848,244 A | * | 7/1989 | Bennett ........................... | 108/38 |
| 5,588,697 A | | 12/1996 | Yoshida et al. | |
| 6,807,902 B1 | * | 10/2004 | Ginter ............................ | 100/44 |
| 6,877,806 B2 | * | 4/2005 | Cutshall et al. ............... | 297/173 |
| 6,923,126 B2 | * | 8/2005 | Verkley ........................... | 108/80 |
| 7,143,701 B2 | * | 12/2006 | Lindstrom et al. ............. | 108/44 |
| 7,267,400 B2 | * | 9/2007 | Cutshall et al. ............... | 297/173 |
| 2006/0261644 A1 | | 11/2006 | Cutshall et al. | |
| 2007/0107640 A1 | * | 5/2007 | Lucatello ....................... | 108/77 |

FOREIGN PATENT DOCUMENTS

| | | |
|---|---|---|
| JP | 63-091948 U | 6/1988 |
| JP | 2934808 B2 | 8/1999 |

(Continued)

OTHER PUBLICATIONS

Office Action issued for JP 2009-233672 (Jan. 21, 2014).

Primary Examiner — Jose V Chen
(74) Attorney, Agent, or Firm — Drinker Biddle & Reath LLP

(57) ABSTRACT

A folding table is provided that includes: a table frame that enables a table body to move between the in-use position and the stowed position, that is disposed within the table body, and that supports the table body; a support member that pivotably supports the table frame; and a lock, provided in a position where the support member and the table frame are linked, that holds the table frame in the in-use position and prevents the table frame from pivoting. The lock has: a retaining member in which an engagement groove is formed; a pivoting member capable of engaging with and disengaging from the engagement groove; and a lock biaser that biases the pivoting member in the direction of engagement with the engagement groove.

7 Claims, 22 Drawing Sheets

(56) References Cited

FOREIGN PATENT DOCUMENTS

| | | |
|---|---|---|
| JP | 2004-182142 A | 7/2004 |
| JP | 2004-321662 A | 11/2004 |
| JP | 3130061 U | 3/2007 |
| JP | 2009-214798 A | 9/2009 |

* cited by examiner

FOLDING TABLE

CROSS REFERENCE TO RELATED APPLICATIONS

This application is the U.S. national phase of the International Patent Application No. PCT/JP2010/066503 filed Sep. 24, 2010, which claims the benefit of Japanese Patent Application No. 2009-233672 filed Oct. 7, 2009, the entire content of which is incorporated herein by reference.

BACKGROUND

The following relates to folding tables, and particularly relates to folding tables in which a table body can be moved between an in-use position and a stowed position.

Folding tables configured so that a table body can be moved between an in-use position, in which the table body is pulled out into an approximately horizontal orientation, and a stowed position, in which the table body is folded into an approximately vertical position, have been known. Such folding tables are used in a variety of applications. For example, in a vehicle, such as an automobile, a folding table for holding objects is provided on the side of the seat, the rear surface of the seat, or the like.

As an example used in a vehicle, a table 100 as shown in FIG. 22 has been proposed. With the table 100, a foldable and unfoldable link 120 linking a table body 110 and an arm 140 that supports the table body 110 on a side of a seat is disposed between the table body 110 and the arm 140, and a lock mechanism 130 that prevents the link 120 from bending is provided. The table 100 is configured so that when the table is in use, the table body 110 is held with the link 120 in an extended state by locking the bending of the link 120 using the lock mechanism 130, whereas when the table is not in use, the table body 110 is folded and put into a stowed state by releasing the lock by manipulating an operation lever 135 linked to the lock mechanism 130 and bending the link 120. A top surface portion 111 of a frame that configures the table body 110 is remade, depending on the design of the table 100 (for example, see Japanese Patent No. 2934808 (particularly paragraphs 0014-0018; FIG. 3) ("the '808 Patent") and Japanese Patent Document No. 2004-182142A (particularly paragraphs 0021-0022; FIG. 3) ("the '142 Patent Document).

SUMMARY

However, the techniques disclosed in the '808 Patent and the '142 Patent Document have had problems in that the constituent elements, such as the link for supporting the table body in an approximately horizontal position, the lock mechanism for locking/unlocking the link in/from the extended state, and so on, when the table is in use, are large, have complex structures, and use a large number of components.

In addition, the structure is such that when the table is unfolded into the in-use position, the link and the lock mechanism support the table body by spanning at an angle downward from the lower side of the table body toward the arm, thus exposing the link and the lock mechanism beneath the table body. There has thus been a problem in that when the table is opened to the in-use position, the space below the table body cannot be used effectively. This has also increased the size of the apparatus as a whole and made it necessary to provide a space for unfolding the link and the lock mechanism.

With the technique disclosed in the '808 Patent, a base frame corresponds to the shape of the table body, and thus it has been necessary, in the case where the design of the table is changed depending on the model, to make a top surface portion anew in accordance with the design. Furthermore, if the length of a hinge portion in the link has changed, it has been necessary to manufacture the link from different members as well.

It is an object of various embodiments of the invention to provide a folding table that has a simple structure and a low number of components, that is thin, small, and light, and that has a low manufacturing cost.

It is another object to provide a folding table that does not require a space for unfolding members such as a lock mechanism when switching between an in-use position and a stowed position and in which the space below the table can be used effectively while also ensuring a secure lock during use.

Further, it is another object to provide a folding table that employs a highly-generic base frame whose structure is thin, simplified, and has a low level of influence on the design.

The stated problem is solved by a folding table described below, which is a folding table capable of moving a table body between an in-use position and a stowed position, the folding table comprising: a table frame that is disposed within the table body and that supports the table body; a support member that pivotably supports one end of the table frame; and a lock that holds the table frame in the in-use position and prevents the table frame from pivoting, the lock being provided in an approximate center of a lengthwise direction of a position where the support member and the table frame are linked; wherein the lock includes: a first engagement member in which an engagement groove is formed; a second engagement member capable of engaging with and disengaging from the engagement groove of the first engagement member; and a lock biaser; wherein the first engagement member and the second engagement member are configured to be capable of engaging and disengaging by one of the first engagement member and the second engagement member being moved, and the lock biaser biases the first or second engagement member that is moved in a direction of engagement.

Because the lock that prevents the pivoting of the table body pivotably supported on one end is provided at the position at which the table body and the support member are linked, the table as a whole can be configured in a compact manner, without members such as a link, a lock, and so on, that support the table body being exposed below the table body, as with a conventional folding table. In addition, a space can be provided below the table, and that space can be used effectively.

In this manner, the lock that prevents the table frame from pivoting is provided at the position where the support member and the table frame are linked, includes the first engagement member and the second engagement member capable of engaging with and disengaging from the engagement groove formed in the first engagement member, is configured to be capable of engagement and disengagement when one of the first engagement member and the second engagement member is moved, and furthermore, the lock biaser biases one of the first engagement member and the second engagement member that is moved in the direction of engagement with the engagement groove; therefore, the locking and unlocking of the first engagement member and the second engagement member occurs at the position where the support member and the table frame are linked, and members such as a link, the lock, and so on, that support the table body are not exposed below the table body, as in the conventional folding table.

Accordingly, a space for unfolding the members such as the link, the lock, and so on, is unnecessary when switching the table body between the in-use position and the stowed position, which makes it possible to effectively use the space below the table.

Here, the configuration can be such that the lock is contained within the table body. By providing the lock in the position where the support member and the table frame are linked, the lock can be contained within the table body, and thus the members of which the lock is configured are not exposed below the table body.

In addition, it is preferable for the table frame to include an approximately plate-shaped main frame and an approximately plate-shaped sub frame that are assembled opposing each other, and for at least part of the lock to be held between the main frame and the sub frame.

By employing a configuration in which the approximately plate-shaped main frame and sub frame are assembled opposing each other and part of the lock is held between the frames, the table frame can be made thinner, smaller, and lighter.

Specifically, it is further preferable for the first engagement member and the second engagement member to be configured of plate members, for the engagement groove to be formed passing through the thickness direction of the first engagement member, and for the second engagement member to be inserted into and engage with the engagement groove to face in a direction orthogonal to the first engagement member.

In this manner, if the first engagement member and the second engagement member are configured of plate members and the lock is configured so that the second engagement member enters into and engages with the engagement groove facing orthogonal to the first engagement member, the structure for locking and unlocking can be simplified and the number of components can be greatly reduced compared to the conventional hinge lock type, which makes it possible to achieve a reduction in manufacturing costs and a reduction in weight. In addition, the lock can be made thinner and smaller, which in turn makes it possible to make the table frame thinner and smaller. Furthermore, because the lock is configured without a hinge, it is not necessary to set a hinge portion on a model-by-model basis; it is only necessary to change the table cover when altering the design, which makes it possible to provide a highly-generic table frame that is not influenced by designs.

In addition, it is preferable for the first engagement member to have an arc-shaped sliding surface on an outer peripheral surface of the first engagement member, and for an end of the second engagement member to make contact with and slide along the sliding surface when the second engagement member exits the engagement groove; for the engagement groove to have a pair of opposing inner wall surfaces and a groove bottom that connects the pair of inner wall surfaces; and for the height from the groove bottom of the inner wall surface in the engagement groove on the opposite side to the sliding surface to be formed to be greater than the height from the groove bottom of the inner wall surface on the side of the sliding surface.

In this manner, the engagement groove is formed, protruding outward, so that the height from the groove bottom of the inner wall surface on the opposite side to the sliding surface along which the end of the second engagement member slides and moves is greater than the height from the groove bottom of the inner wall surface on the side of the sliding surface; thus when the table is moved from the stowed position to the in-use position, the second engagement member moves in the direction of the engagement groove along the outer peripheral surface and makes contact with the protruding inner wall surface, whereupon the movement is stopped and the second engagement member enters the engagement groove. In other words, one of the inner wall surfaces of the engagement groove functions as a stopper for the second engagement member when the table is moved from the stowed position to the in-use position. Accordingly, a stopper can be provided for the second engagement member without an additional member, which makes it possible to reduce the number of components.

In addition, it is preferable for the folding table to further include a table biaser that biases the table frame in the direction of the stowed position.

In this manner, the table biaser that biases the table frame in the direction of the stowed position is provided, and thus when the second engagement member disengages from the engagement groove of the first engagement member, the pulling force of the table biaser in the direction of the stowed position and torque generated by the weight of the table body make it possible to easily and smoothly move the table body including the table frame from the in-use position to the stowed position. In addition, when the table is stowed, the stowed state can be held with certainty, and rattles can be prevented. Furthermore, it is possible to prevent sudden loads from being applied when unfolding the table body from the stowed position to the in-use position, which improves the operability and the durability.

Furthermore, it is preferable for the support member to be formed of a pipe member; and for the main frame and the sub frame to be attached to the pivotably support member with the pipe member held between the main frame and the sub frame, and the ends of the main frame and the sub frame on the sides that hold the support member to be linked using a hemming crimp.

According to this configuration, it is not necessary to additionally use a member for linking the table frame and the support member, a member for linking the main frame and the sub frame, and so on, which makes it possible to reduce the number of components and makes it easy to attach the table frame. In the case where the configuration is such that a damper is provided and the location where the main frame and the sub frame are connected by the hemming crimp makes contact with the damper to stop the pivoting of the table frame at a predetermined position, the table can be effectively prevented from flopping by the table frame making contact with the damper at the position of the hemming crimp, which makes it possible to prevent the damper from being damaged.

According to embodiments of the folding table described herein, the folding table can be configured so that the members that support the table body, the members in the lock, and so on are not exposed below the table body; furthermore, when switching between the in-use position and the stowed position, it is not necessary to provide a space for unfolding members such as a link, the lock, and so on, which makes it possible to effectively use the space below the table.

According to embodiments of the folding table described herein, the table frame can be made thinner, smaller, and lighter.

According to embodiments of the folding table described herein, the structure of the lock can be simplified and the number of components can be greatly reduced compared to the conventional hinge lock type, which makes it possible to achieve a reduction in manufacturing costs and a reduction in weight. In addition, the table frame can be made thinner and smaller, and the table frame can be configured so that the table frame is not influenced by the design of the table cover.

Furthermore, it is only necessary to change the table cover when altering the design, which makes it possible to provide a highly-generic table frame that is less influenced by designs.

According to embodiments of the folding table described herein, a stopper for the engagement member can be provided without an additional member, which makes it possible to reduce the number of components.

According to embodiments of the folding table described herein, the table body can be easily and smoothly moved from the in-use position to the stowed position, and when the table is stowed, the stowed state can be held with certainty, and rattles can be prevented. Furthermore, it is possible to prevent sudden loads from being applied when unfolding the table body from the stowed position to the in-use position, which improves the operability and the durability.

According to embodiments of the folding table described herein, the number of components can be reduced, and the table frame can be attached with ease.

DETAILED DESCRIPTION

Hereinafter, embodiments of the present invention will be described with reference to the drawings. Note that the constituent elements, the positions thereof, and so on, indicated hereinafter are not intended to limit the present invention, and it goes without saying that many variations can be made within the scope of the present invention.

Although a table body of a folding table according to the present embodiment is unfolded into an approximately horizontal position that serves as an in-use position and is stowed in an approximately vertical position that serves as a stowed position, it should be noted that the in-use position and the stowed position are not limited thereto; these positions refer to positions set so that when the folding table is in use and is stowed, the table body can be held in such states.

Figure 1:
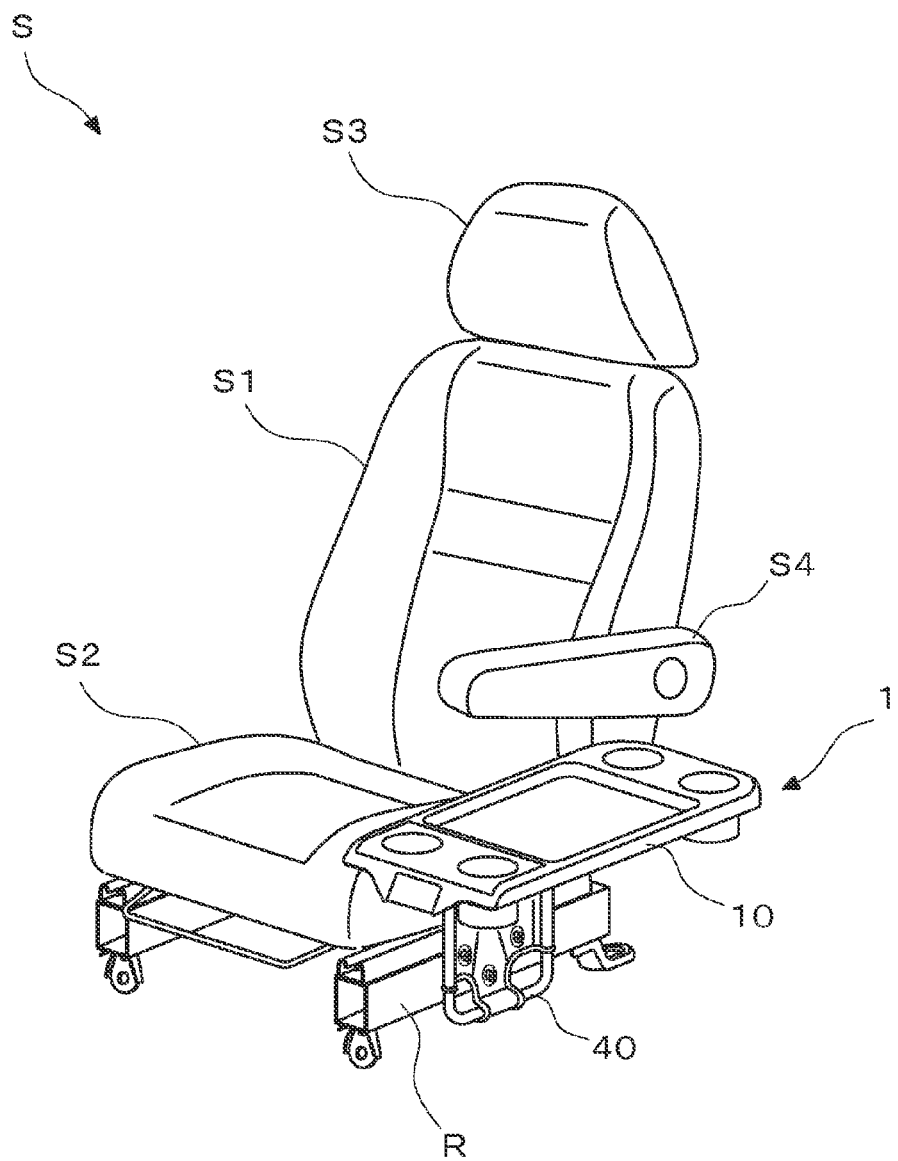
FIG. 1 is a schematic perspective view of a seat provided with a folding table.

FIG. 1 through FIG. 19 illustrate an embodiment of the present invention. A folding table (called a table hereinafter) 1 according to the present embodiment is, as shown in FIG. 1, disposed in a foldable manner on a side of a vehicle seat S (called a seat hereinafter) in an automobile or the like. The seat S according to the present embodiment is configured to include a seat back S1, a seating portion S2, a headrest S3, and an armrest S4. The seat back S1 and the seating portion S2 each have a known configuration in which cushion pads are placed on a frame (not shown) and are covered with a skin material, whereas the headrest S3 and the armrest S4 each have a known configuration in which a core (not shown) is covered by a skin material with cushion pads interposed therebetween, and thus details thereof will be omitted.

A seat riser R that supports slide rails of the seat S is disposed between the seat S and the vehicle floor, and the table 1 is provided, via the seat riser R, on the side of the seat S that faces the middle of the vehicle.

The table 1 according to the present embodiment is a folding table in which a table body 10 that holds a desired item can be moved between an in-use state, in which the table body 10 is unfolded into an in-use position that corresponds to an approximately horizontal position, and a stowed state, in which the table body 10 is folded into a stowed position that corresponds to an approximately vertical position; an arm 40 serving as a support member that pivotably supports one end of the table body 10 is attached to a side of the seat S by being fastened, using fasteners such as bolts or the like, to the seat riser R via a bracket (not shown).

Although the table 1 is attached by anchoring the arm 40 to the seat riser R in the present embodiment, it should be noted that the method for attaching the table 1 is not limited thereto; for example, the arm 40 may be attached to a seat frame in the seating portion S2 of the seat S via a bracket, and the table 1 may be disposed to move backward and forward along with the seat S when the seat S is slid backward and forward.

Furthermore, although the table 1 is provided on a side of the seat S in the present embodiment, the table 1 may be provided on the rear surface of the seat S, the inner side of a door, a side of a trunk, or the like.

Figure 2:
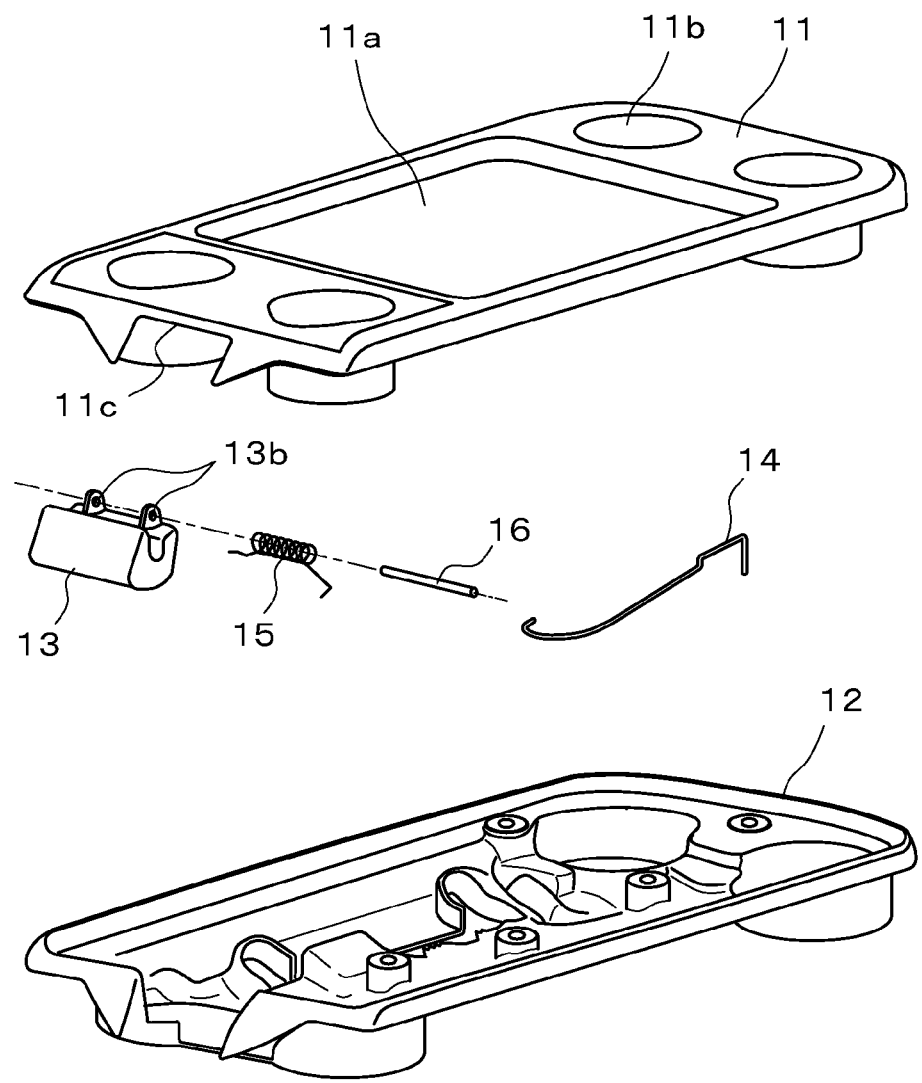
FIG. 2 is an exploded perspective view of a table cover.
Figure 3:
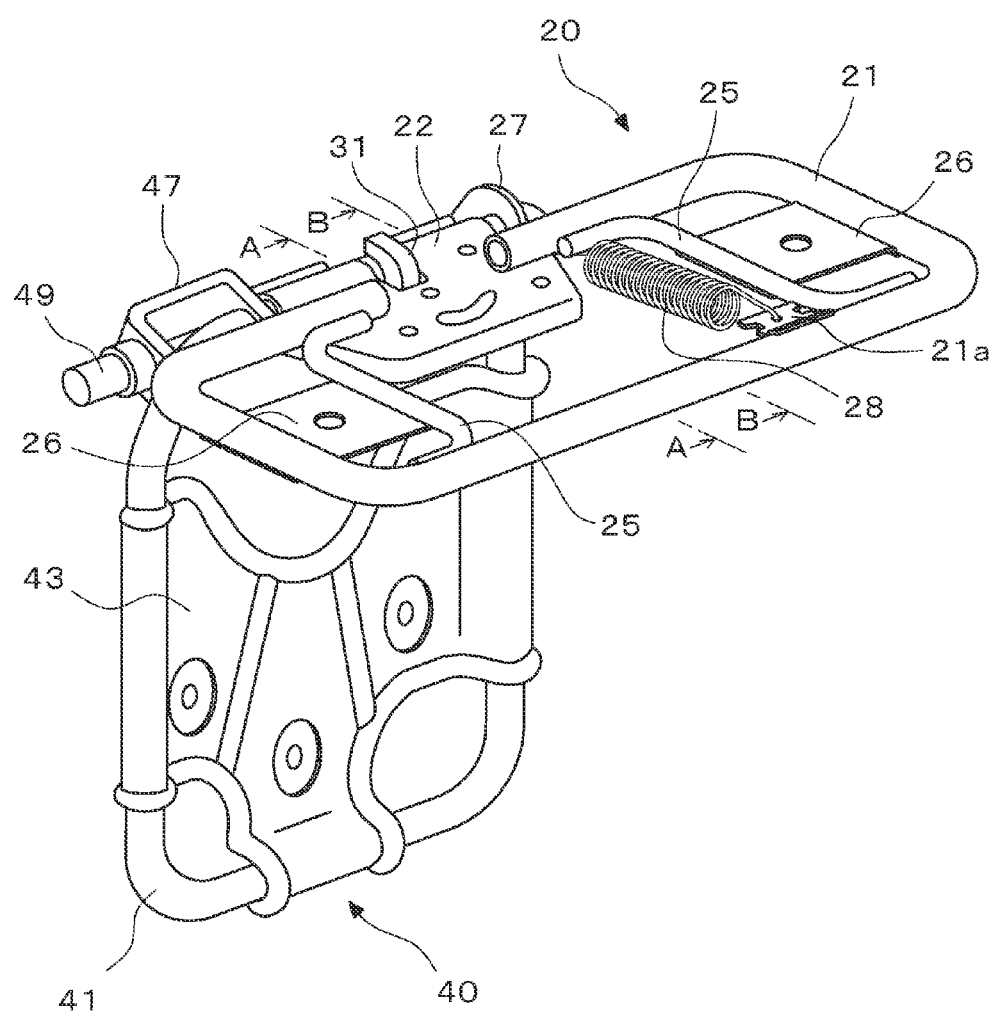
FIG. 3 is a perspective view of a table frame and a support member.

As shown in FIG. 2 and FIG. 3, the table 1 according to the present embodiment is configured to have: a table frame 20; an upper cover 11 and a lower cover 12 serving as table covers that cover the table frame 20 from above and below, respectively; and the arm 40 that pivotably supports the table body 10 by pivotably supporting the table frame 20. Note that the table body 10 is configured to have the upper cover 11, the lower cover 12, and the table frame 20.

The upper cover 11 and the lower cover 12 according to the present embodiment are made of a resin, and a putting-on surface 11a on which items are put, round recessed portions 11b used as cup holders or holders for small objects, and so on are formed in the upper cover 11. An operating lever 13, a lever rod 14, and a lever spring 15, which serve as an operating assembly for operating a lock 30 that will be described later, are attached to the upper cover 11 via a lever shaft 16. Furthermore, a damper (not shown) for absorbing impacts when the lower cover 12 makes contact with the arm 40 during stowage (see FIG. 17) is attached below the lower cover 12, and an insertion hole through which the arm 40 is inserted is covered by a lower cover cap (not shown).

Figure 4:
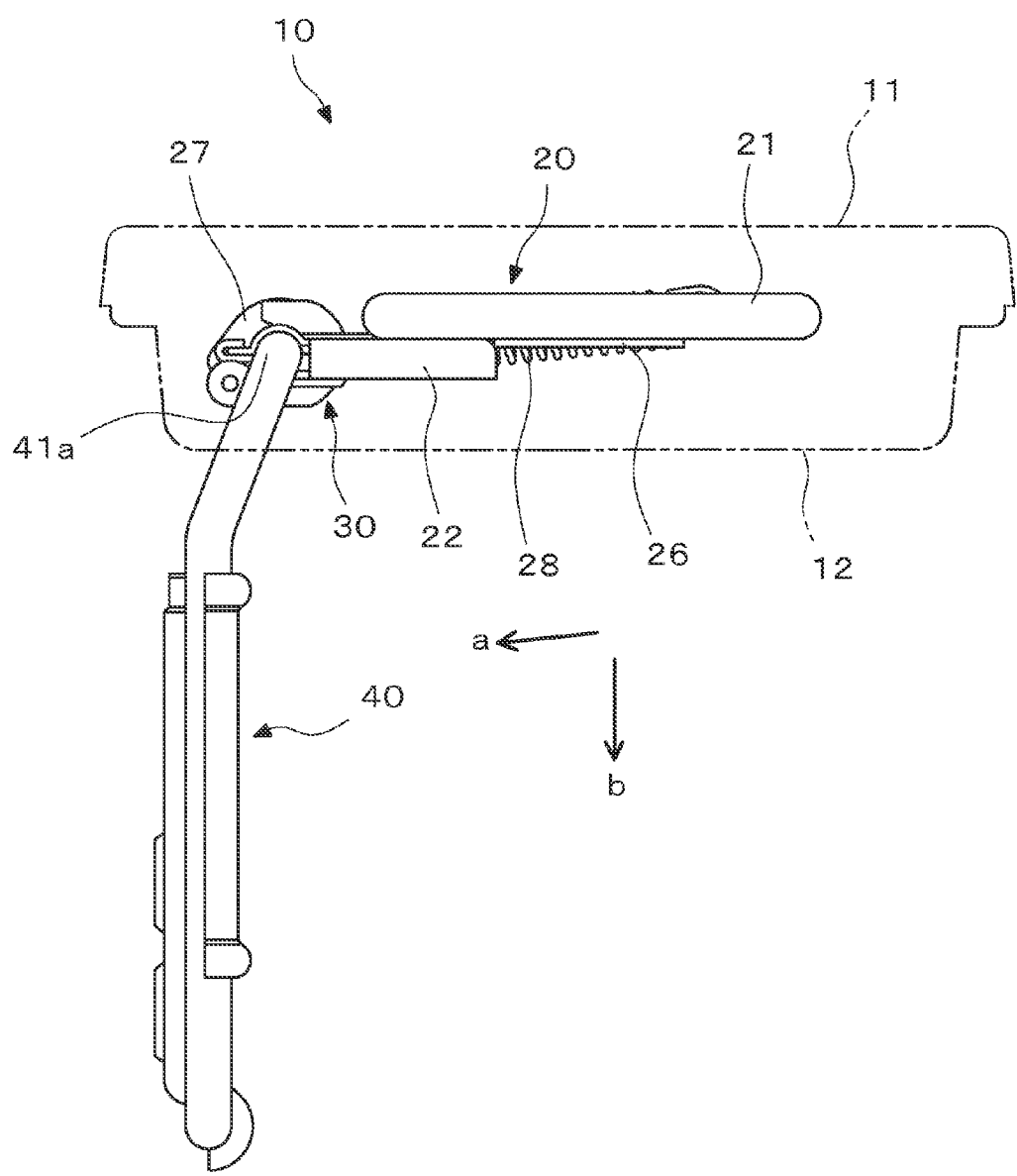
FIG. 4 is a side view of a table frame and a support member.
Figure 5:
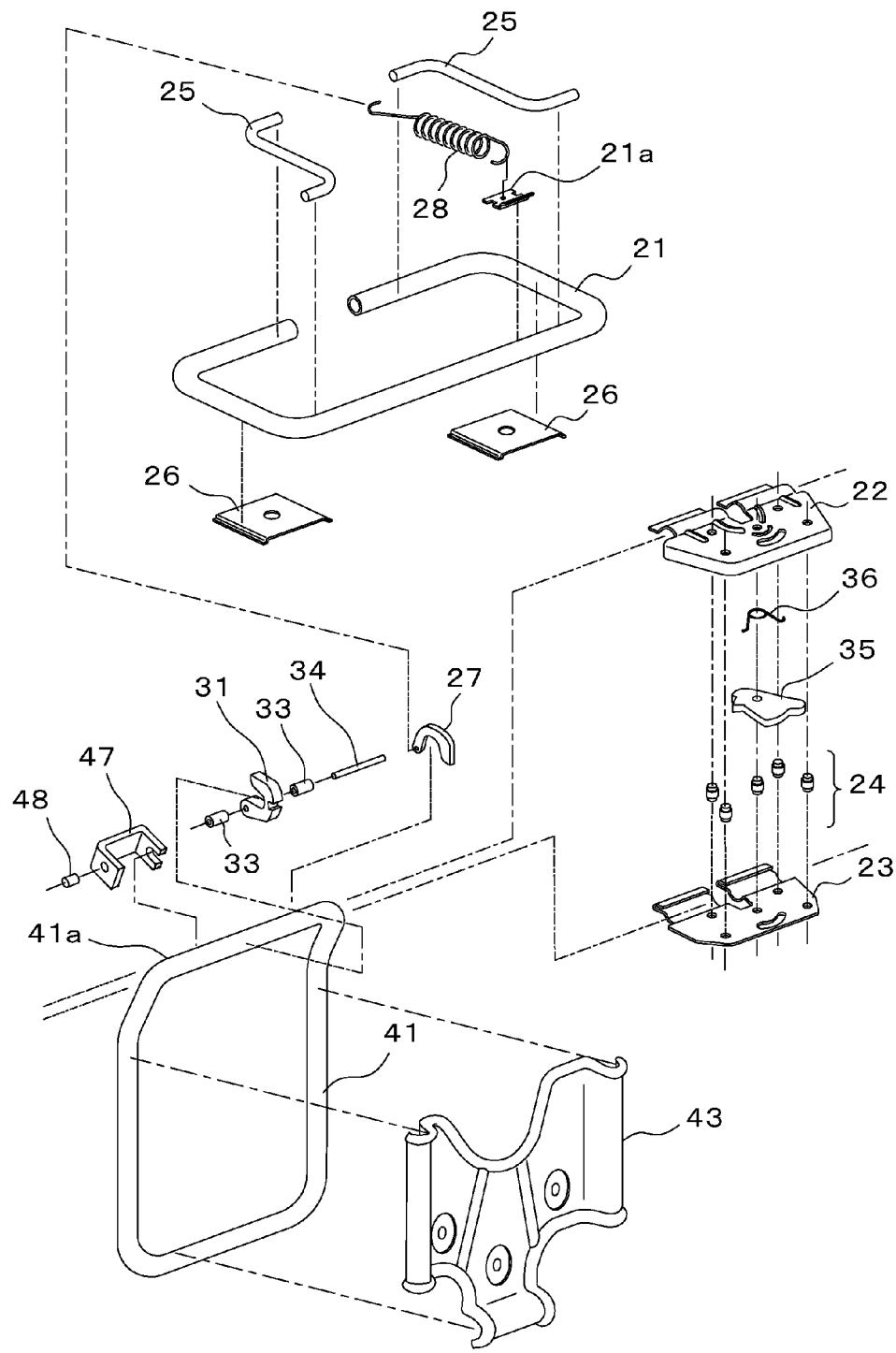
FIG. 5 is an exploded perspective view of a table frame and a support member.

The table frame 20 according to the present embodiment supports the table body 10 and is disposed within the table body 10 to be held between and covered by the upper cover 11 and the lower cover 12; and as shown in FIG. 3 through FIG. 5, is configured of a pipe frame 21, a main frame 22, a sub frame 23, reinforcing pipes 25, reinforcing brackets 26, a table spring 28, and so on. Note that the dashed line shown in FIG. 4 indicates the outline of the upper cover 11 and the lower cover 12 when those covers are attached to the table frame 20.

The pipe frame 21 is formed by bending a pipe member into an approximately rectangular shape, and is formed having a size capable of supporting the table body 10 when the table body 10 is in an approximately horizontal state. The pipe frame 21 is disposed so that an imaginary surface formed by the rectangular pipe is oriented approximately parallel to the surface of the main frame 22, and one side of the pipe frame 21 is fixed to the surface of the main frame 22 through welding or the like. Note that the side that is welded has a cutout in the central area thereof to not interfere with the movement of a pivoting member 35 and the like (described later) provided in approximately the inner center of the main frame 22.

Figure 6:
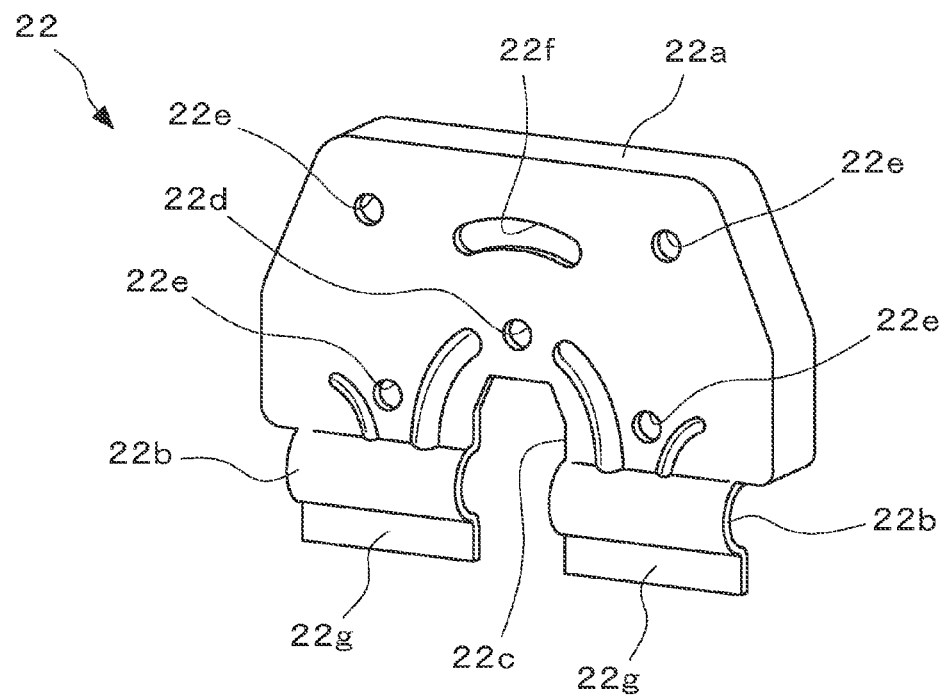
FIG. 6 is a perspective view of a main frame and a sub frame.
Figure 6:
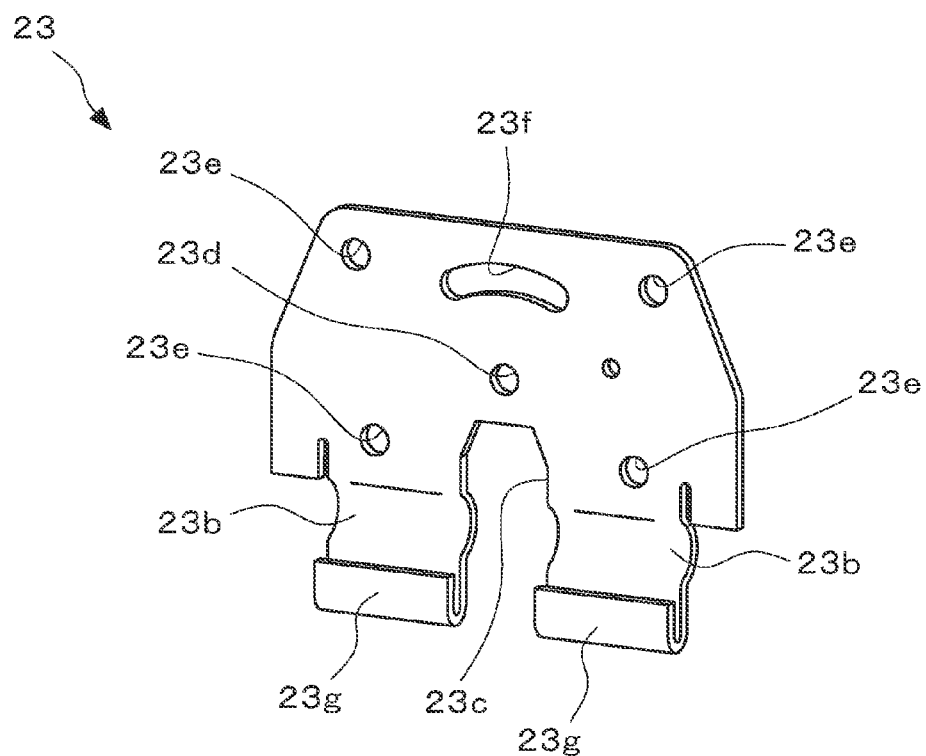
Figure 7:
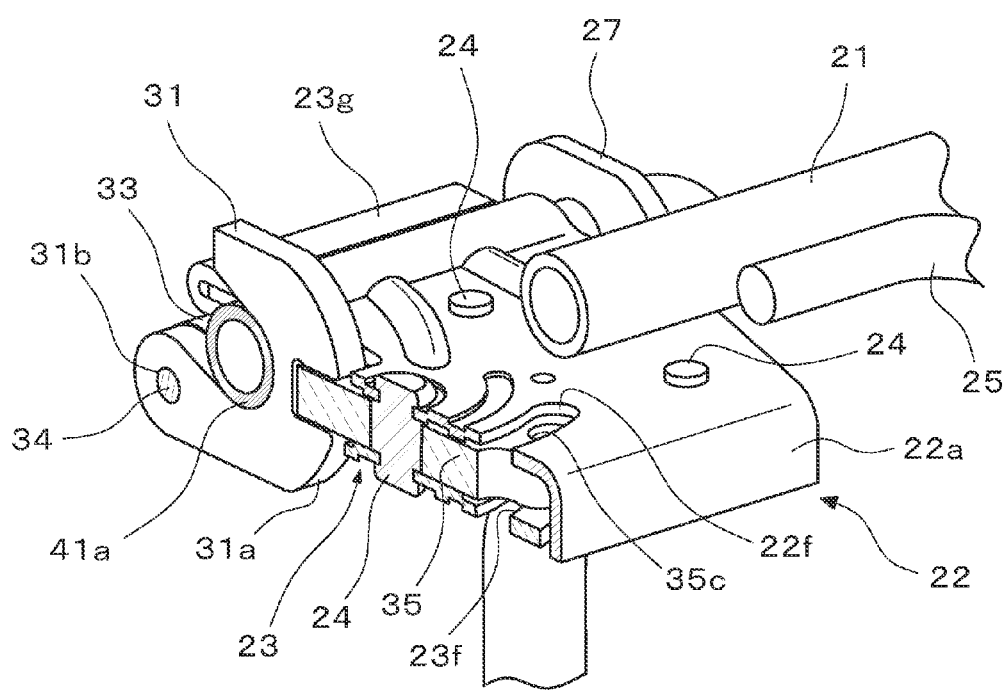
FIG. 7 is a cross-sectional perspective view of a table frame, viewed along an A-A line.

As shown in FIG. 6 in FIG. 7, the main frame 22 is configured of an approximately rectangular plane-shaped plate member, and a bent portion 22a that is bent inward is formed on three of the outer sides thereof other than a predetermined area; thus the main frame 22 is formed having a space inward thereof. Assembly recesses 22b bent in an approximately half-pipe shape in order to enclose and hold an arm pipe 41 of the arm 40 are formed in the remaining one side, slightly inward from the edge of that side, extending parallel to that side and with a gap between the assembly recesses 22b. Furthermore, a cutout portion 22c of a predetermined length is formed in approximately the middle of the lengthwise direction of the assembly recesses 22b, extending toward the center of the main frame 22 in the direction orthogonal to the stated lengthwise direction. This cutout portion 22c is for inserting a retaining member 31, which will be described later.

In addition, a rivet hole 22d is provided in the approximate center of the main frame 22, whereas rivet holes 22e are provided in four locations inward from the outer periphery of the main frame 22. An arc-shaped guidance groove 22f having a predetermined length that is central to the rivet hole 22d is provided on the opposite side to the rivet hole 22d provided in the approximate center of the assembly recesses 22b. In addition, hemming crimp portions 22g are formed to continue from the assembly recesses 22b and extend outward, parallel to the surface in which the rivet hole 22d is formed.

Figure 8:
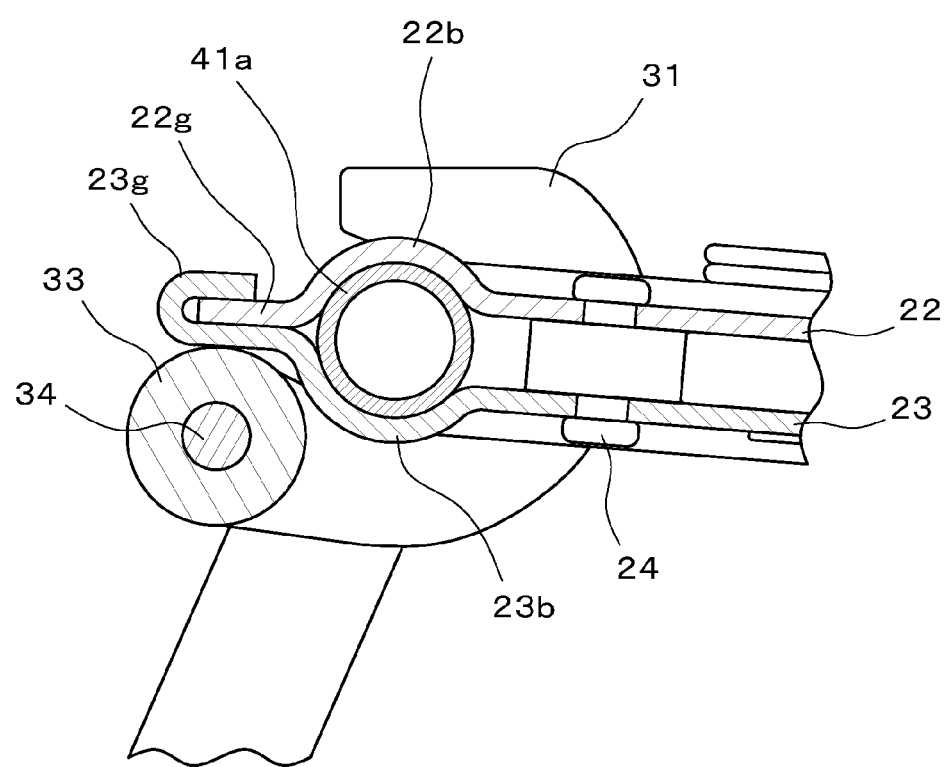
FIG. 8 is a partial cross-sectional view of a table frame.

The sub frame 23 is configured of an approximately rectangular plane-shaped plate member formed so that the outer periphery thereof have the same approximate shape as the outer periphery of the main frame 22, and is configured to overlap with the main frame 22 opposite therefrom with a certain distance therebetween, and be attached thereto. Attachment recesses 23b bent into an approximately half-pipe shape in the opposite direction to the half-pipes of the assembly recesses 22b are formed in the positions opposite to the assembly recesses 22b of the main frame 22, with a gap between the assembly recesses 23b. As shown in FIG. 8, an upper portion 41a of the arm pipe 41 in the arm 40 is enclosed and held by the assembly recesses 22b of the main frame 22 and the assembly recesses 23b of the sub frame 23. In this manner, the main frame 22 and the sub frame 23 are supported in a pivotable manner on the upper portion 41a of the arm pipe 41, with the upper portion 41a serving as the pivot axis thereof. In other words, the table frame 20 is supported in a pivotable manner by the arm 40 at the position where the main frame 22 and the sub frame 23 are linked to the arm pipe 41.

Although the configuration of the arm 40 will be described in detail later, the arm 40 is configured to have the arm pipe 41 in which a pipe member is formed as an approximate rectangle; in the present embodiment, the arm 40 is linked to the table frame 20 as described above by the upper portion 41a, which corresponds to the upper side of the rectangular pipe member.

A cutout portion 23c of a predetermined length for inserting the retaining member 31 (mentioned later) is formed in approximately the middle of the lengthwise direction of the assembly recesses 23b of the sub frame 23, extending toward the center of the main frame 22 in the direction orthogonal to the stated lengthwise direction. In addition, rivet holes 23d, 23e and a guidance groove 23f are provided in positions in the sub frame 23 that oppose the rivet holes 22d and 22e and the guidance groove 22f of the main frame 22.

Furthermore, hemming crimp portions 23g are formed to continue from the assembly recesses 23b and extend outward, parallel to the surface in which the rivet hole 22d is formed. The hemming crimp portions 23g of the sub frame 23 extend further outward than the hemming crimp portions 22g of the main frame 22; and as shown in FIG. 8, the hemming crimp portions 23g are bent approximately 180 degrees to form a hemming crimp, thus holding and linking with the opposing hemming crimp portions 22g in the main frame 22. The pivoting member 35 (mentioned later) is enclosed between the main frame 22 and the sub frame 23, after which rivets 24 are inserted through the respective corresponding rivet holes 22d, 22e and 23d, 23e in the main frame 22 and the sub frame 23, thus linking the main frame 22 and the sub frame 23.

Although the hemming crimp portions 23g of the sub frame 23 are bent to form a hemming crimp and the main frame 22 and sub frame 23 are linked on the ends thereof on which the arm pipe 41 is located, these ends may be linked through welding such as spot welding, thus connecting the main frame 22 and the sub frame 23.

A pair of reinforcing pipes 25, 25 for reinforcing the pipe frame 21 are provided on the inner side of the rectangle formed by the pipe frame 21, spanning between the pipes on the longer sides of the rectangle, and furthermore, a pair of reinforcing brackets 26, 26 are provided spanning between the pipes on the shorter sides of the rectangle and the reinforcing pipes 25, 25. In addition, a retaining portion 21a is provided in a position, on the inner side of the rectangle formed by the pipe frame 21, that opposes the position at which the main frame 22 and the upper portion 41a of the arm pipe 41 are linked; a retaining bracket 27 having a retaining hole is provided on the outer side of the position of the upper portion 41a in the arm pipe 41 where the main frame 22 is attached.

Figure 9:
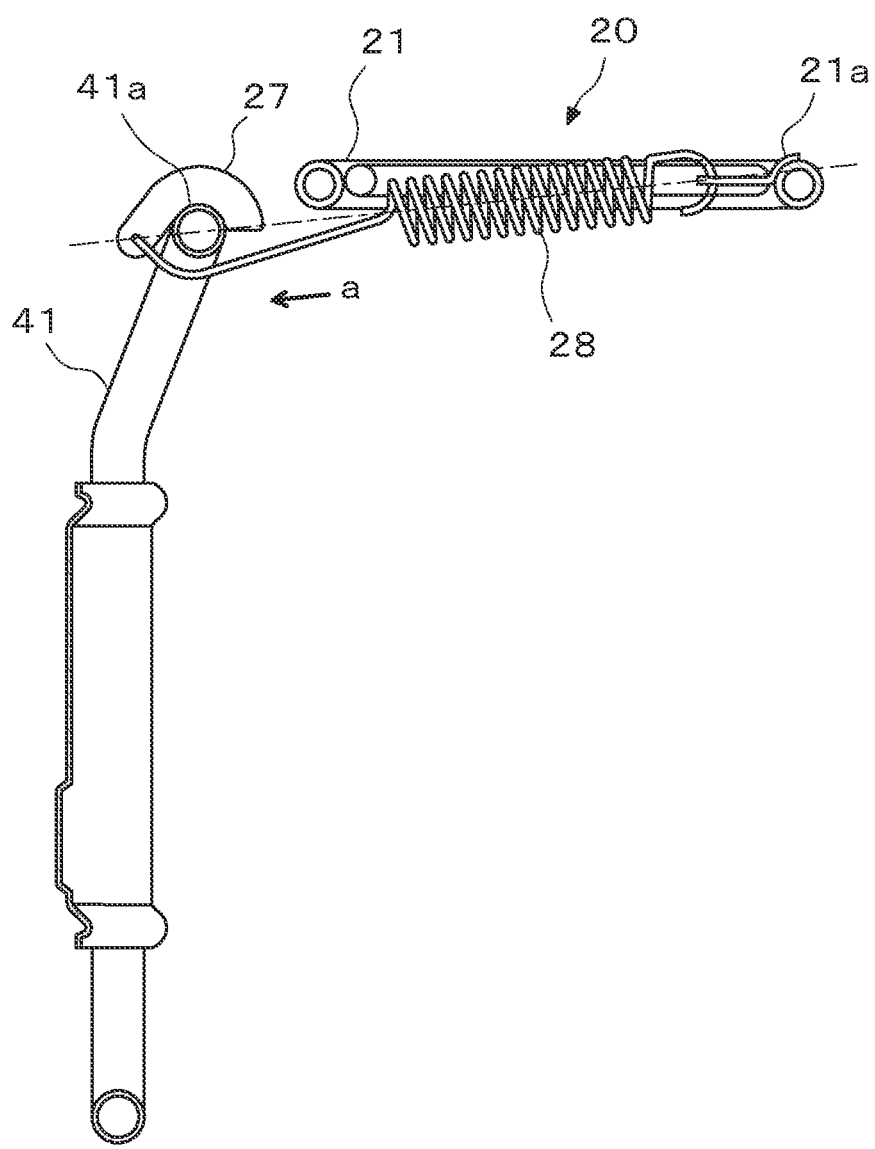
FIG. 9 is cross-sectional view of a table frame, viewed along a B-B line.

As shown in FIG. 9, one end of the table spring 28 is engaged with the retaining portion 21a, and the other end is engaged with the retaining bracket 27 and is extended between the pipe frame 21 and the arm pipe 41, thus biasing the table frame 20 in a direction that is parallel to the dashed line in FIG. 9 and that corresponds to the direction of the upper portion 41a in the arm pipe 41 (the direction of the arrow a), or in other words, in the direction of the stowed position (a folding direction). The table spring 28 serves as a table biaser, and an extension coil spring is used as the table spring 28 in the present embodiment.

Note that although FIG. 9 is a cross-sectional view seen along the B-B line shown in FIG. 3, the main frame 22 and the sub frame 23 are not shown for the sake of simplicity.

In this manner, a pipe member is used as the frame (the pipe frame 21) for the upper surface portion of the table frame 20, and the table cover (the upper cover 11 and the lower cover 12) that has additional structures such as cup holders is made from a resin; thus it is possible to use the same table frame 20, even for different models, without being influenced by the design, which increases the general applicability of the table frame 20 and eliminates the need to prepare press molds for the top surface portions of the frames for different models.

Furthermore, using a pipe member for the table frame 20 ensures rigidity, which in turn ensures strength. Note that the number of components of which the lock 30 described later is less than that of conventional configurations, and thus has a lighter weight; it is thus possible to reduce the strength of the pipe frame 21 as compared to conventional frames.

Figure 10:
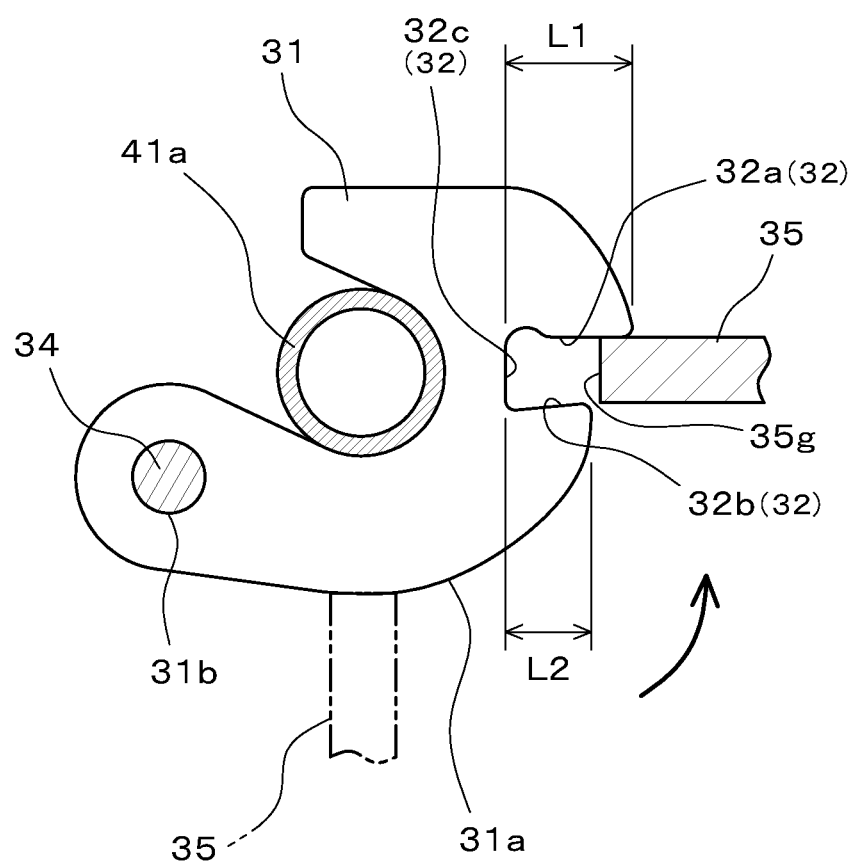
FIG. 10 is a pictorial diagram illustrating a lock.

The retaining member 31, which serves as a first engagement member, is provided in the approximate center of the lengthwise direction of the upper portion 41a in the arm pipe 41. As shown in FIG. 7 and FIG. 10, the retaining member 31 according to the present embodiment is configured of an approximately C-shaped plate member having a predetermined thickness, and the pipe member of which the upper portion 41a of the arm pipe 41 is configured is fitted into the recess in the center of this C shape and fixed thereto through welding or the like, with the retaining member 31 facing orthogonally relative to the lengthwise direction of the upper portion 41a, or in other words, relative to the axial line of the pivot axis on which the table frame 20 pivots. Meanwhile, an engagement groove 32, serving as a second engagement member and with which the pivoting member 35 is engaged, is formed on the opposite side of the C-shaped opening to pass through the retaining member 31 in the thickness direction thereof. The retaining member 31 has an arc-shaped outer peripheral surface, and part of the outer peripheral surface below the engagement groove 32 serves as a sliding surface 31a along which an end portion of the pivoting member 35 slides and moves.

The engagement groove 32 is formed having a predetermined length, from the outer peripheral surface of the retaining member 31 to the center thereof, in a direction approximately orthogonal to the lengthwise direction of the arm pipe 41, and the inner wall surface of the engagement groove 32 is formed by three surfaces including a pair of an upper surface 32a and a lower surface 32b that oppose each other in an approximately parallel orientation, and an approximately vertical groove bottom 32c that connects the upper surface 32a and the lower surface 32b. The end of the upper surface 32a on the outer side thereof, which is the inner wall surface on the opposite side to the sliding surface 31a on which the pivoting member 35 slides when the pivoting member 35 exits the engagement groove 32 and moves, is formed to protrude further outward than the end of the lower surface 32b on the outer side thereof, which is the inner wall surface on the same side as the sliding surface 31a. In other words, the engagement groove 32 is formed so that a height L1 from the groove bottom 32c to the upper surface 32a (that is, the distance from the groove bottom 32c to the end of the upper surface 32a on same side as the outer peripheral surface) is greater than a height L2 from the groove bottom 32c to the lower surface 32b (that is, the distance from the groove bottom 32c to the end of the lower surface 32b on the same side as the outer peripheral surface).

As shown in FIG. 10, when the pivoting member 35 slides on the sliding surface 31a from below the retaining member 31 and moves as far as the engagement groove 32, the pivoting member 35 makes contact with the end of the upper surface 32a on the outer side thereof that protrudes outward from the engagement groove 32, thus preventing the pivoting member 35 from moving. In this manner, setting the height of the inner wall surface of the engagement groove 32 (that is, the upper surface 32a), which is a position on the opposite side to the side on which the pivoting member 35 moves, from the groove bottom 32c to be greater than the height from the other inner wall surface regulates the movement of the pivoting member 35 by way of that surface, which makes it possible to regulate the pivoting of the table frame 20. Accordingly, without an additional member to serve as stopper, a stopper that stops the pivoting of the table frame 20 can be provided with a simple configuration.

A shaft hole 31b is formed in the retaining member 31 on the opposite side to the engagement groove 32, and dampers 33 (see FIG. 5) can be attached via a shaft 34. The dampers 33 are hollow cylinders configured of a rubber material or the like, and the retaining member 31 is surrounded on both sides by two of the dampers 33; the shaft hole 31b of the retaining member 31 and the hollow portions of the dampers 33 are aligned and the rod-shaped shaft 34 is passed therethrough, which attaches the dampers 33 to the retaining member 31.

As shown in FIG. 8, the dampers 33 are provided somewhat below the upper portion 41a of the arm pipe 41, and on the opposite side to the table frame 20. In addition, when the table frame 20 is in the approximately horizontal position, the dampers 33 are disposed in a position in which the dampers 33 make contact with the hemming crimp portions 23g of the sub frame 23 below the hemming crimp portions 23g. The dampers 33 prevent rattling, squeaking, and so on of the table frame 20 when the table body 10 is in the in-use position, and makes it possible to suppress sudden movements of the table body 10 near the in-use position when switching between the in-use position and the stowed position.

In addition, because the hemming crimp portions 23g are bent and crimped on the opposite side to the dampers 33, the edges of the crimped areas (the ends of the hemming crimp portions 23g) do not make contact with the dampers 33, and thus the dampers 33 are not damaged. Although the main frame 22 and the sub frame 23 are linked by bending the hemming crimp portions 23g to form a hemming crimp in the present embodiment, it should be noted that a configuration that does not damage the dampers 33 can also be achieved in the case where the hemming crimp portions 23g are fixed to the hemming crimp portions 22g through welding such as spot welding.

Figure 11:
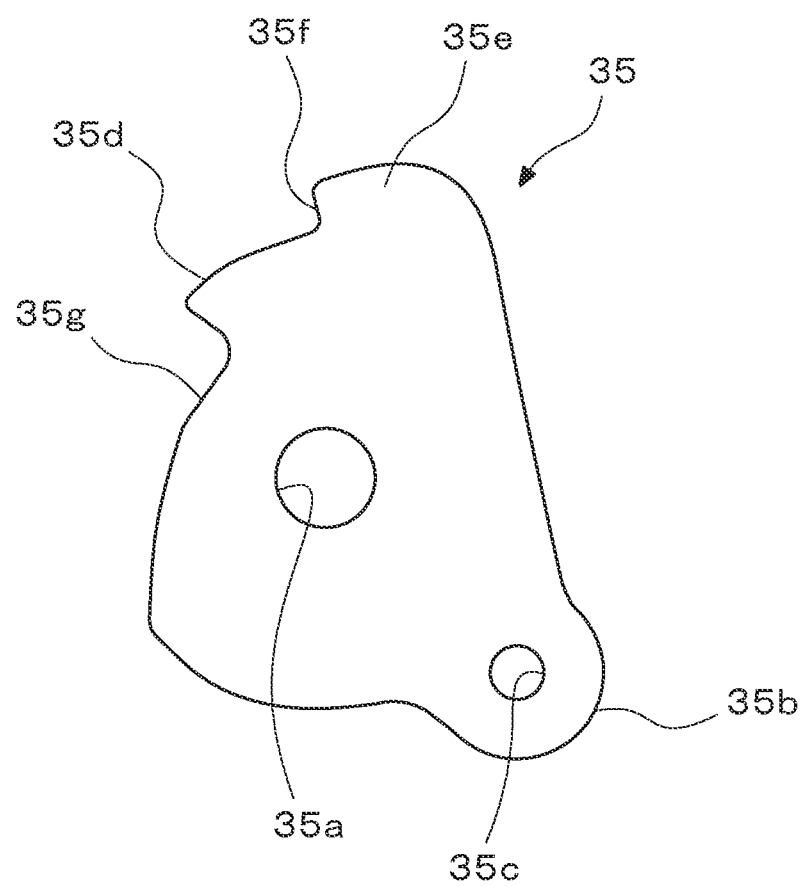
FIG. 11 is a pictorial diagram illustrating a pivoting member.

The pivoting member 35, serving as the second engagement member, is pivotably and axially supported in the approximate center between the main frame 22 and the sub frame 23. The pivoting member 35 according to the present embodiment is formed from a plate member having a predetermined thickness, and as shown in FIG. 11, has a shaft hole 35a that serves as a pivoting axis in its approximate center. The pivoting member 35 is pivotally supported the rivet 24 being passed through the rivet hole 22d in the approximate center of the main frame 22, the shaft hole 35a of the pivoting member 35, and the rivet hole 23d in the approximate center of the sub frame 23. The pivoting member 35 is attached so that its pivoting surface is parallel with the surface of the main frame 22 and the surface of the sub frame 23 and is held therebetween (see FIG. 7). In this manner, the pivoting member 35 is provided to be approximately parallel with the main frame 22 and the sub frame 23 that hold the upper portion 41a of the arm pipe 41 in the lengthwise direction, or in other words, is disposed to be facing approximately orthogonal to the retaining member 31 that is provided approximately orthogonal to the lengthwise direction of the upper portion 41a.

A bulge portion 35b that bulges approximately circularly in the outward direction of the pivoting member 35 is formed in one end thereof, and a lever retaining hole 35c for retaining the lever rod 14, which will be mentioned later, is formed in the bulge portion 35b. The lever retaining hole 35c is, as shown in FIG. 7, formed in a position that corresponds to the guidance groove 22f of the main frame 22 and the guidance groove 23f of the sub frame 23 when the pivoting member 35 is disposed between the main frame 22 and the sub frame 23. Specifically, the guidance grooves 22f, 23f are formed as arcs that overlap with arcs that follow the trajectory of the lever retaining hole 35c when the pivoting member 35 is pivoted central to the shaft hole 35a.

Furthermore, an engagement protrusion 35d that protrudes in the outward direction is formed in opposite side to the bulge portion 35b relative to the shaft hole 35a. The engagement protrusion 35d is a portion that enters into and engages with the engagement groove 32 of the retaining member 31. A contact portion 35e that extends further in the outward direction is formed to continue from the engagement protrusion 35d. The contact portion 35e has a contact surface 35f that makes contact with the retaining member 31 when the engagement protrusion 35d engages with the engagement groove 32 of the retaining member 31, and functions as a stopper that regulates the pivoting of the pivoting member 35. By forming one end of the pivoting member 35 to protrude in the outward direction, a stopper can be provided with a simple configuration without an additional member to serve as stopper.

In addition, a sliding surface 35g, which slides along the sliding surface 31a in the outer peripheral surface of the retaining member 31 when the engagement protrusion 35d exits the engagement groove 32 of the retaining member 31, is continuously formed from the opposite side end to the contact portion 35e of the engagement protrusion 35d, in an approximately orthogonal direction to the engagement protrusion 35d.

Figure 12:
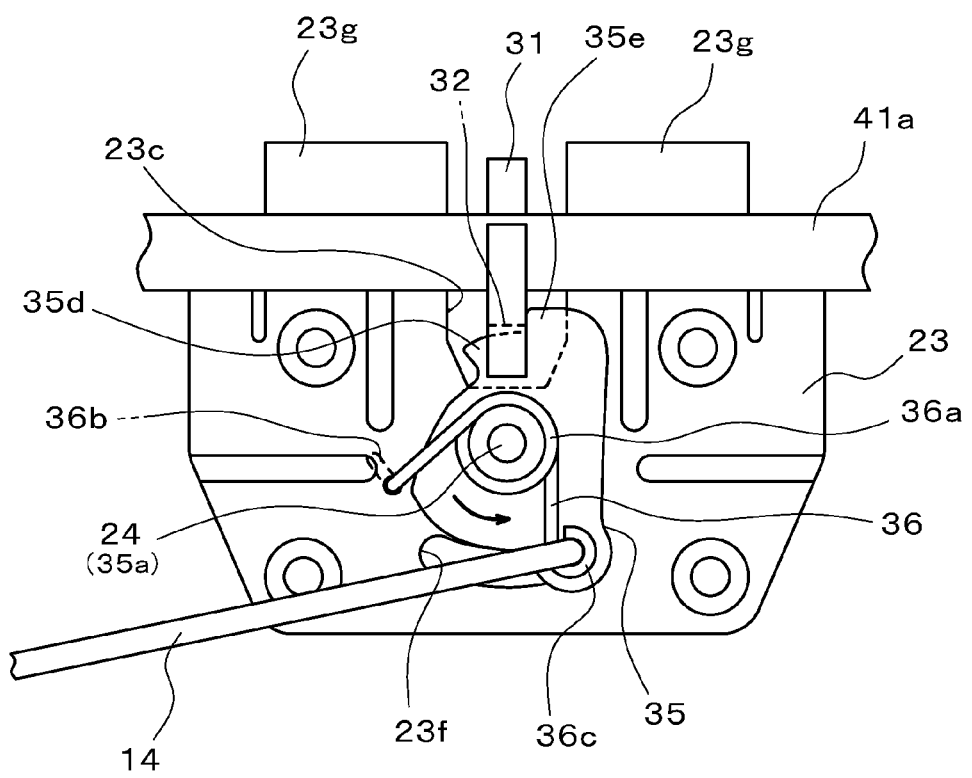
FIG. 12 is a pictorial diagram illustrating a lock.

FIG. 12 is a descriptive diagram illustrating from above the pivoting member 35 attached between the main frame 22 and the sub frame 23, in a state where the table body 10 is in the approximately horizontal in-use position. Note that for the sake of simplicity, the main frame 22 is not shown in FIG. 12.

When the table body 10 is in the in-use position, the pivoting member 35 is disposed so that the engagement protrusion 35d enters into and engages with the engagement groove 32 of the retaining member 31 in an orientation that is orthogonal thereto. In this manner, because the contact portion 35e protrudes outward, the contact portion 35e is formed at a size that prevents the contact portion 35e from entering into the engagement groove 32; the contact surface 35f (see FIG. 11) makes contact with one of the outside surfaces of the retaining member 31, thus preventing the pivoting member 35 from pivoting.

Furthermore, a lock spring 36 that serves as a lock biaser is provided on the pivoting member 35 on the side thereof that faces the main frame 22. In the present embodiment, the lock spring 36 is configured of a torsion spring, and the lock spring 36 is disposed by winding a coil portion 36a of the torsion spring around the outside of the rivet 24 that is inserted into the shaft hole 35a. One end 36b that extends from the coil portion 36a is inserted into an attachment hole provided in the sub frame 23, and the tip of the end 36b is bent approximately 90 degrees on the rear side of the sub frame 23, thus anchoring the lock spring 36 to the sub frame 23. The other end 36c that extends from the coil portion 36a is pivotably retained by being wound around the lever rod 14 that is retained by the lever retaining hole 35c. The lock spring 36 attached in this manner continually biases the pivoting member 35 in the direction in which the engagement protrusion 35d of the pivoting member 35 engages with the engagement groove 32 of the retaining member 31 (in other words, the counterclockwise direction, in FIG. 12).

The aforementioned main frame 22, sub frame 23, and pivoting member 35 are attached to the arm pipe 41 and the retaining member 31 as described hereinafter.

The retaining member 31 is inserted into the cutout portion 23c of the sub frame 23 from below the upper portion 41a of the arm pipe 41 and disposed so that the assembly recesses 23b make contact with the lower side of the upper portion 41a. Then, the shaft hole 35a of the pivoting member 35 is aligned with the rivet hole 23d of the sub frame 23, the engagement protrusion 35d of the pivoting member 35 is fitted into the engagement groove 32 of the retaining member 31, and the pivoting member 35 is disposed above the sub frame 23. Next, the coil portion 36a of the lock spring 36 is disposed to be aligned with the shaft hole 35a of the pivoting member 35, and the one end 36b of the lock spring 36 is inserted and anchored in an attachment hole in the sub frame 23. The retaining member 31 is then inserted into the cutout portion 22c of the main frame 22 from above the upper portion 41a of the arm pipe 41 and disposed so that the assembly recesses 22b make contact with the upper side of the upper portion 41a. The rivets 24 are then inserted and anchored in the rivet holes 22d, 23d and 22e, 23e in the main frame 22 and the sub frame 23, and the hemming crimp portions 23g of the sub frame 23 are bent to enclose the hemming crimp portions 22g of the main frame 22.

As described thus far, the pivoting member 35 is fitted into the engagement groove 32 facing a direction orthogonal to the retaining member 31, and the main frame 22 and sub frame 23 are attached to the arm pipe 41. In this manner, when the table frame 20 is put into an approximately horizontal position, the pivoting member 35 is axially supported between the main frame 22 and the sub frame 23 so that the pivoting surface of the pivoting member 35 is approximately horizontal, and is fitted into the engagement groove 32 of the retaining member 31 that is disposed approximately orthogonal to the pivoting member 35. In this state, the lock spring 36 biases the engagement protrusion 35d of the pivoting member 35 in the direction in which the engagement protrusion 35d engages with the engagement groove 32, and thus the engagement between the pivoting member 35 and the engagement groove 32 of the retaining member 31 is maintained.

Accordingly, the pivoting member 35 provided in the table frame 20 is engaged in an orthogonal orientation relative to the retaining member 31; this prevents the table frame 20, which takes the upper portion 41a of the arm pipe 41 as its pivot axis, from pivoting, thus preventing the table frame 20 from moving in the direction of the stowed position. The lock 30 according to the present embodiment is configured of the retaining member 31, the pivoting member 35, and the lock spring 36. The lock 30 uses the engagement between the pivoting member 35 and the retaining member 31 to hold the table body 10 (the table frame 20) in the in-use position and prevent the table body 10 from moving (pivoting) in the direction of the stowed position.

Because the lock 30 is configured of the retaining member 31 and the pivoting member 35 in this manner, the structure of the lock 30 is simple, the number of components therein is greatly reduced, and the lock 30 can be made smaller and lighter. Furthermore, the pivoting member 35 and the lock spring 36, which are part of the lock 30, can be contained between the main frame 22 and the sub frame 23, which makes it possible to make the lock 30 thinner, and also makes it possible to employ the same table frame 20 and lock 30 in different models.

Figure 13:
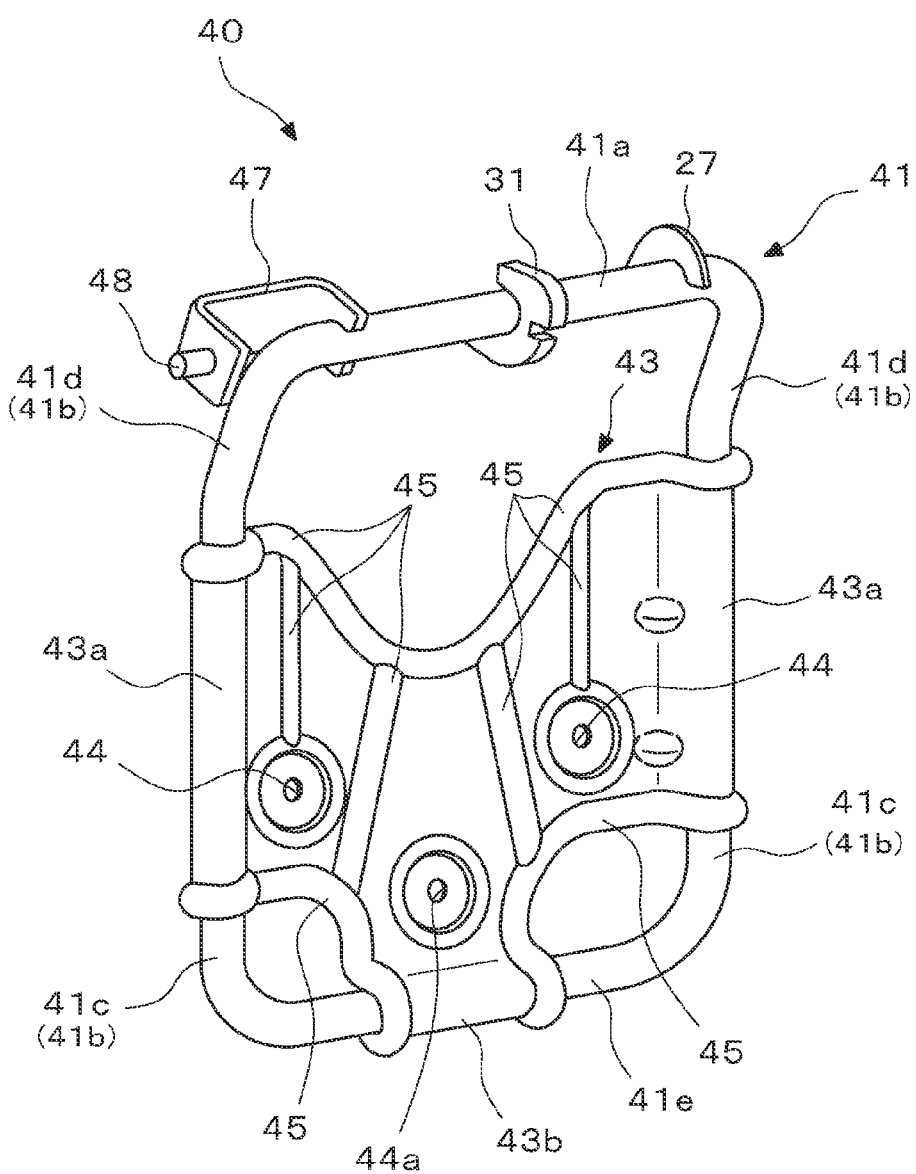
FIG. 13 is a perspective view of a support member.
Figure 14:
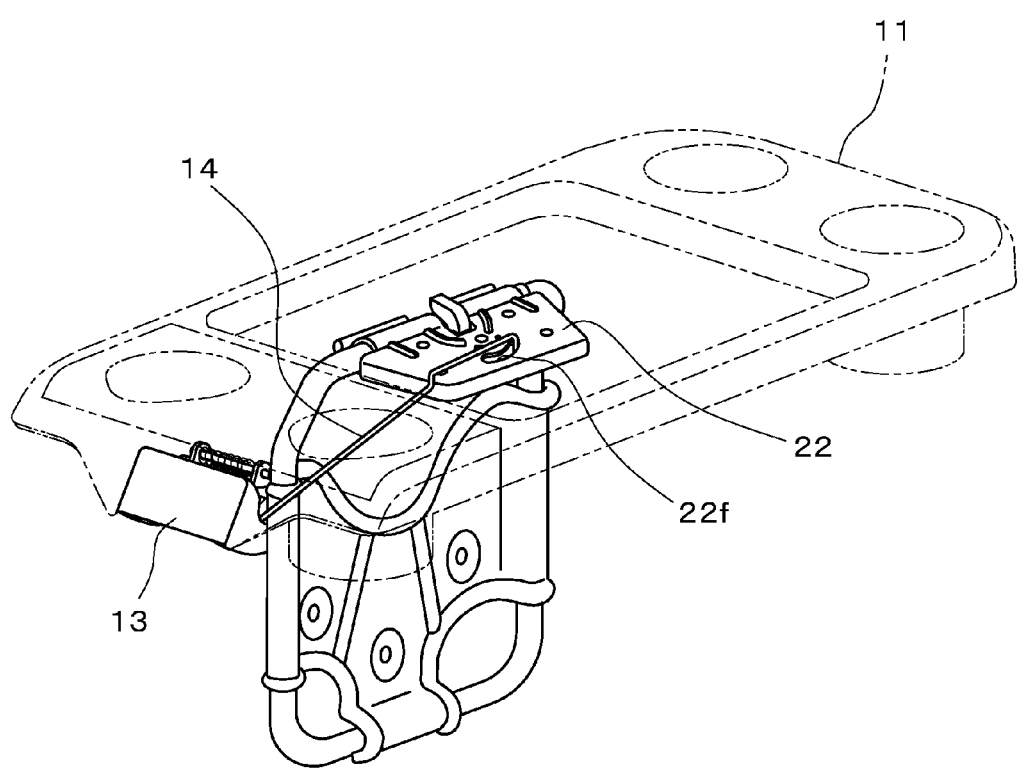
FIG. 14 is a perspective view diagram illustrating an operating assembly.

The arm 40 according to the present embodiment is a support member for pivotably supporting one end side of the table frame 20 and anchoring the table 1 to a side of the seat S, and as shown in FIG. 13, is configured to include the arm pipe 41 that is a pipe member formed as an approximate rectangle, and an arm bracket 43 that is disposed on the inner side of the arm pipe 41 and reinforces the arm pipe 41. A pair of left and right side portions 41b, 41b of the arm pipe 41 are provided in a bent manner so that portions thereof that are positioned higher than the middles form a predetermined angle, and include vertical portions 41c, 41c that extend vertically downward from the bent locations and sloped portions 41d, 41d that extend at an upward angle from the bent locations. The tops and bottoms of the left and right side portions 41b, 41b are connected to each other by the upper portion 41a and a lower portion 41e, respectively.

As described above, the upper portion 41a is held by the main frame 22 and the sub frame 23, and the main frame 22 and sub frame 23 are pivotable; thus the table frame 20 is pivotably supported on the upper portion 41a. In addition, the retaining member 31 that configures part of the lock 30, the retaining bracket 27 for retaining one end of the table spring 28, and so on are anchored to the upper portion 41a.

The arm bracket 43 according to the present embodiment is an approximately U-shaped plate member in which are formed attachment portions 43a, 43a and 43b that bulge outward on the left and right and at the bottom in an approximate half-pipe shape. The side portions 41b and 41b (vertical portions 41c and 41c) of the arm pipe 41 are fitted into the attachment portions 43a and 43a of the arm bracket 43, the lower portion 41e is fitted into the attachment portion 43b, and the arm bracket 43 is attached on the inner side of the arm pipe 41 from the direction in which the sloped portions 41d extend.

Bolt holes 44 for anchoring the arm bracket 43 to the seat riser R of the seat S are provided in three locations in the arm bracket 43. Bolts are inserted into the bolt holes 44 and secured with nuts, thus attaching the arm 40 to a side of the seat riser R and in turn attaching the table 1 to a side of the seat S.

Because the arm bracket 43 is formed as an approximate U shape and as a concave shape whose upper side is recessed, the free space in that concave shape can be effectively used as space for maintenance when attaching the arm bracket 43, performing maintenance on components disposed below the seat S while the arm bracket 43 is attached, and so on; this improves the maintainability of the seat S.

Furthermore, reinforcing beads 45 that bulge outward in an approximate half-circle band shape are formed in the arm bracket 43 according to the present embodiment, along the periphery thereof and between the bolt holes 44; the reinforcing beads 45 increase the strength of the plate-shaped arm bracket 43.

A damper bracket 47 is anchored, through welding or the like, to one side end of the upper portion 41a of the arm pipe 41, and a damper 49 (see FIG. 3) is attached to the damper bracket 47 via a damper pin 48. The damper 49 is an element for damping the speed of movement when the pipe frame 21 moves between the in-use position and the stowed position and suppressing sudden movements. The axis line of the cylindrical member of the damper 49 (that is, the damper pin 48) is shifted slightly from the axis line of the pivot axis of the table body 10 (the table frame 20), and the configuration is such that the pivoting force of the table body 10 is dispersed.

The table 1 according to the present embodiment is configured in this manner, and as shown in FIG. 4, the lock 30 is provided in a position at which the upper portion 41a located on the upper end of the arm 40 is linked to the table frame 20, and the lock 30 is contained within the table body 10; therefore, in the in-use position, in which the table body 10 is in an approximately horizontal position, there are no members, such as a lock mechanism or a link, exposed below the table body 10. Accordingly, it is not necessary to provide a space for unfolding a lock mechanism or the like below the table body 10, and thus the area below the table body 10 can be used effectively.

An operating assembly manipulated when unlocking the table 1 from the in-use state, and operations of the operating assembly, will be described with reference to FIG. 12 and FIG. 14 through FIGS. 16A-F. The operating assembly according to the present embodiment is configured of: the operating lever 13, which is manipulated by an operator; the lever rod 14 that links the operating lever 13 and the pivoting member 35; the lever spring 15 that biases the lever rod 14 in the direction in which the operating lever 13 is manipulated; and the lever shaft 16 that attaches the operating lever 13 and the lever spring 15 to the upper cover 11.

The operating lever 13 is formed of: a rectangular plate-shaped grip portion 13a that is gripped by the operator; shaft holes 13b (see FIG. 2) into which the lever shaft 16 for attachment to the upper cover 11 is inserted; and a long-hole type rod retaining hole 13c, for retaining the lever rod 14, that is formed in a surface continuing in the depth direction from a front surface that corresponds to the rectangular plate-shaped surface of the grip portion 13a and extending in a direction approximately orthogonal to the grip portion 13a.

The operating lever 13 is pivotably mounted in an operating lever attachment recess 11c of the upper cover 11 (see FIG. 2) using the lever shaft 16 as an axis, by inserting the lever shaft 16 into shaft holes (not shown) of the upper cover 11, the shaft holes 13b of the operating lever 13, and a coil portion 15a of the lever spring 15 that is configured of a torsion spring, and attaching push nuts on both sides thereof.

One end of the lever rod 14 is retained in the rod retaining hole 13c of the operating lever 13, and the other end thereof is inserted into the guidance groove 22f from the upper surface side of the main frame 22 and is retained in the lever retaining hole 35c of the pivoting member 35, thus linking the operating lever 13 and the pivoting member 35.

Figure 15:
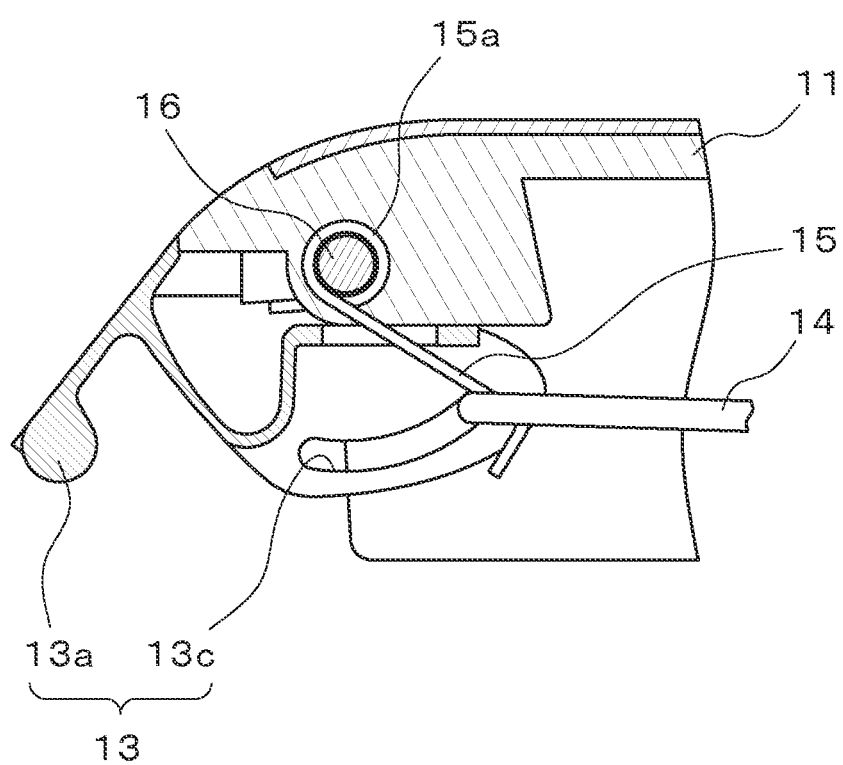
FIG. 15 is a pictorial diagram illustrating an operating assembly.

The lever spring 15 is disposed on the inner side of the operating lever 13, and one end of the lever spring 15 is retained by a protruding portion of the operating lever 13 in which the shaft hole 13b is formed, whereas the other end thereof is retained on the end of the lever rod 14 that is attached to the operating lever 13, from the direction facing the main body of the lever rod 14 (that is, the inner side of the upper cover 11); the lever spring 15 thus continually biases the lever rod 14 in the direction of movement when the operating lever 13 is manipulated, or in other words, in the pulling direction of the lever rod 14 (the left side, in FIG. 15). The bias of the lever spring 15 suppresses rattles and prevents noise in the lever rod 14 and operating lever 13. Furthermore, the lever spring 15 makes it possible to return the operating lever 13 to its initial position regardless of the position of the table 1, including after the operating lever 13 has been lifted and the pivoting member 35 and retaining member 31 have been disengaged.

Figure 16A:
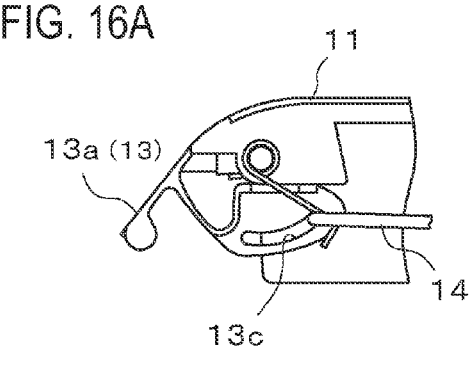
FIGS. 16A-F are pictorial diagrams illustrating an operating assembly and a lock.
Figure 16B:
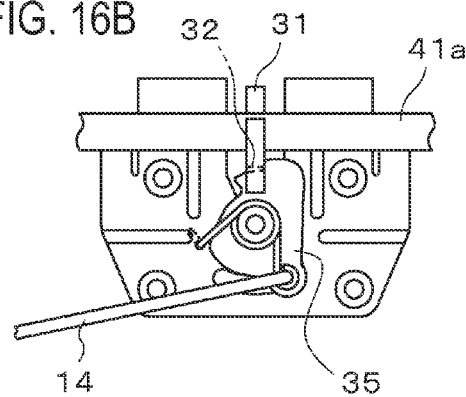
Figure 16C:
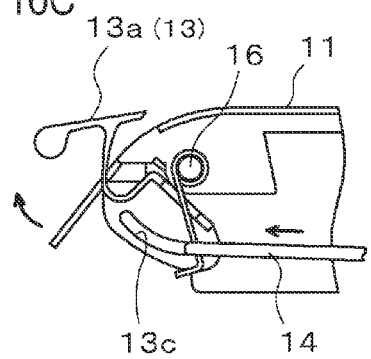
Figure 16D:
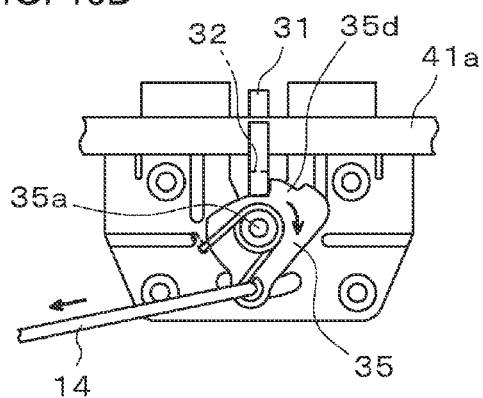
Figure 16E:
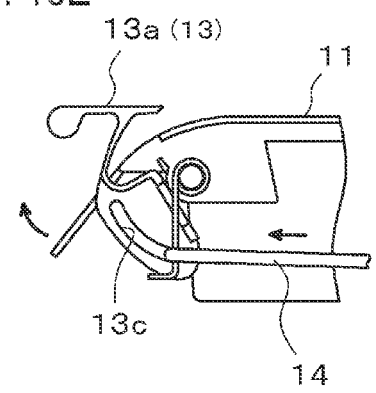
Figure 16F:
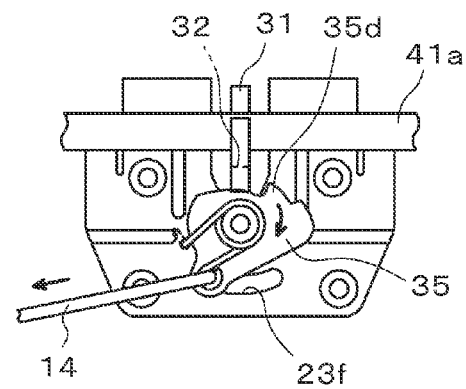

FIGS. 16A-F illustrate operations performed when unlocking the lock 30 by manipulating the operating assembly, where FIG. 16A is a descriptive diagram illustrating the operating assembly in a state where the lock 30 is locked and the table body 10 is held in the in-use position, FIG. 16B is a descriptive diagram illustrating the lock 30 in that state, FIG. 16C is a descriptive diagram illustrating the operating assembly when the lock 30 is unlocked by manipulating the operating assembly, FIG. 16D is a descriptive diagram illustrating the lock 30 in that state, FIG. 16E is a descriptive diagram illustrating the operating assembly when the operating assembly has been manipulated to a maximum lifted position, and FIG. 16F is a descriptive diagram illustrating the lock 30 in that state.

As shown in FIG. 16C, when the operating lever 13 attached to the upper cover 11 is lifted upward from the state shown in FIG. 16A, the operating lever 13 pivots upward central to the lever shaft 16, and the lever rod 14 retained in the retaining hole 13c moves in the manipulation direction (the pulling direction; left, in FIG. 16C) in tandem therewith; the pivoting member 35 linked to the other end of the lever rod 14 is also pulled by the lever rod 14 in tandem with the stated pivoting, thus pivoting central to the shaft hole 35a in the manipulation direction. Then, as shown in FIG. 16D, when the pivoting member 35 pivots by a predetermined angle, the engagement protrusion 35d exits the engagement groove 32, and the retaining member 31 and the pivoting member 35 are disengaged. Note that if the end of the engagement protrusion 35d on the opposite side to the contact portion 35e is formed to be parallel with the side surface of the retaining member 31 (that is, the surface that is perpendicular to the outer peripheral surface) in the disengaged position (the position illustrated in FIG. 16D), the pivoting member 35 can be disengaged from the retaining member 31 smoothly, and this configuration is thus favorable.

When the operating lever 13 is lifted further, as shown in FIG. 16F, the end of the lever rod 14 on the side of the pivoting member 35 makes contact with the ends of the guidance groove 23f of the sub frame 23 and the guidance groove 22f of the main frame 22 on the side toward the operating assembly (the left side, in FIG. 16F), thus preventing the lever rod 14 from moving. The movement of the operating lever 13 is stopped at the position illustrated in FIG. 16E.

Note that because the operating assembly and the lock 30 are configured as described above, in the case where the table cover has been altered for a different model or the like, changing the length of the lever rod 14 that links the operating lever 13 and the pivoting member 35 makes it possible to use the same table frame 20 and lock 30 described in the present embodiment.

The movement of the table body 10 between the in-use position and the stowed position will be described hereinafter.

When the retaining member 31 and the pivoting member 35 are disengaged and the lock 30 is unlocked by manipulating the operating assembly, the pulling force of the table spring 28 serving as a table biaser (a force in the direction of the arrow a in FIG. 4) and torque generated by the weight of the table body 10 (a force in the direction of the arrow b in FIG. 4, which is the vertical direction) cause the table body 10 to begin to pivot downward central to the upper portion 41a of the arm pipe 41, thus starting the stowage. At this time, the pivoting member 35 has exited the engagement groove 32, or in other words, has pivoted to the position illustrated in FIG. 16D, and the sliding surface 35g of the pivoting member 35 slides downward along the sliding surface 31a of the retaining member 31. The table body 10 then pivots until a damper (not shown) provided below the lower cover 12 makes contact with the arm 40, moving to the approximately vertical stowed position and entering the stowed state. Note that the table body 10 is pivoted downward and stowed while the pivoting speed of the table body 10 is dampened by the damper 49 attached to the upper portion 41a.

Figure 17:
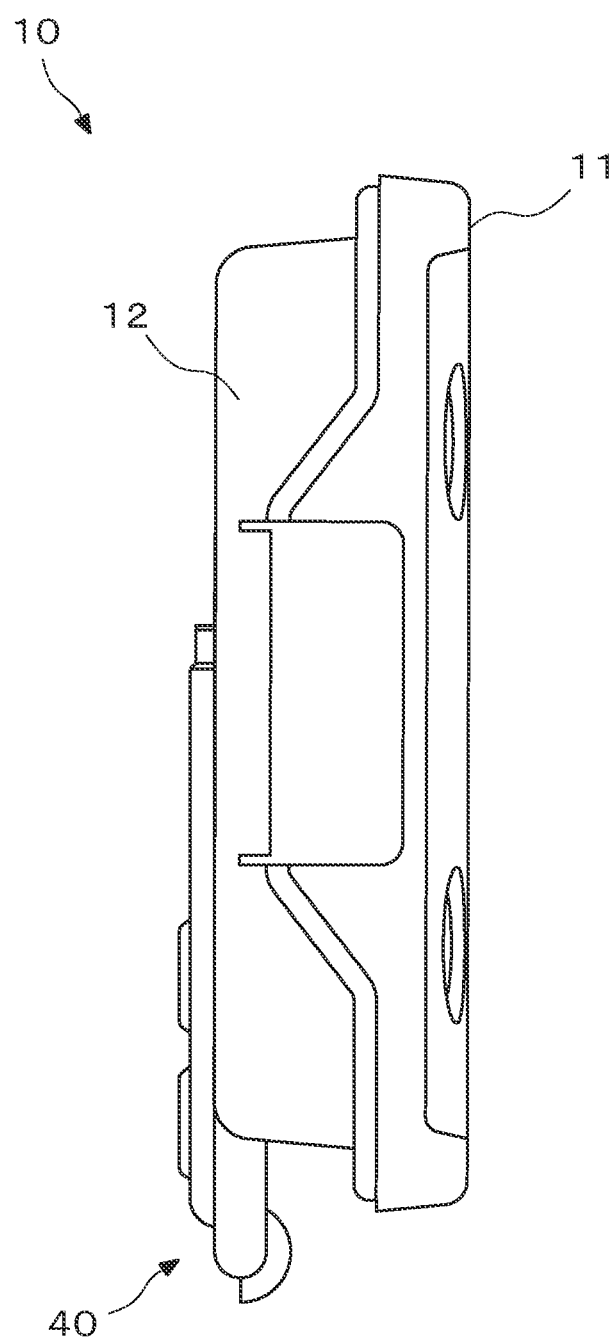
FIG. 17 is a side view of a folding table.
Figure 18:
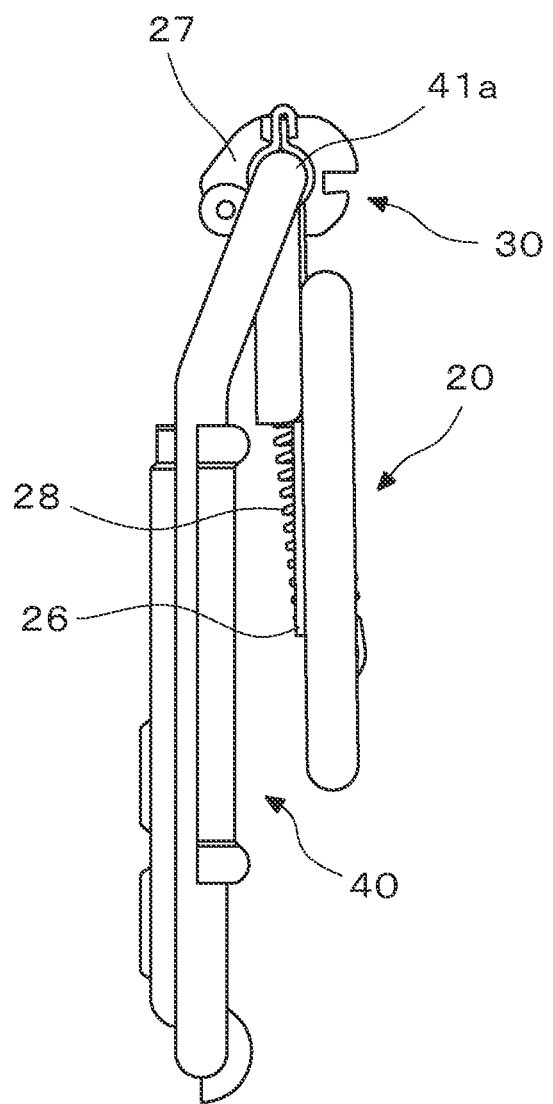
FIG. 18 is a side view of a table frame.
Figure 19:
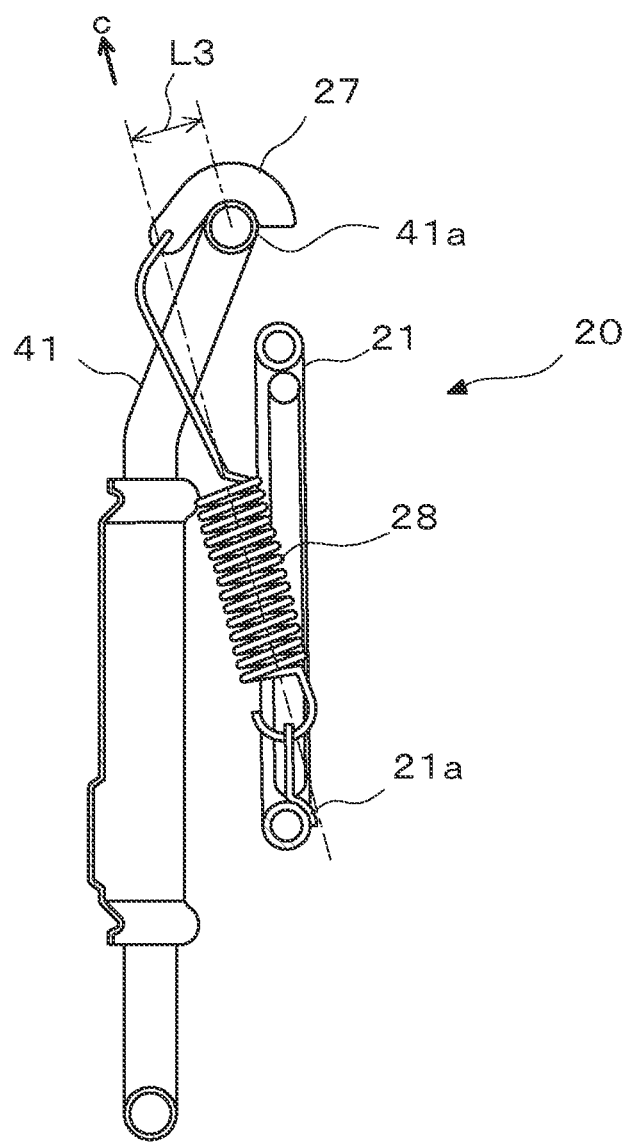
FIG. 19 is a partial cross-sectional view of a table frame.

FIG. 17 is a side view of the table body 10 when folded into the stowed position, whereas FIG. 18 is a side view of the table frame 20 in the stowed position. As shown in FIG. 19, in the stowed state, the table frame 20 is biased, by the pulling force of the table spring 28, in a direction that is parallel to the dashed line and that follows the direction of the upper portion 41a of the arm pipe 41 (the direction of the arrow c), or in other words, in the direction of the stowed position (the folding direction), and thus the stowed state is maintained. As a result, the table body 10 is prevented from rattling when in the stowed state. Note that the pulling force of the table spring 28 at this time is determined by the weight of the table body 10, the position of the center of gravity of the table body 10, and a distance between the pivoting center of the table body 10 and the point at which the retaining bracket 27 of the table spring 28 is retained (L3, in FIG. 19); thus in the present embodiment, the pulling force of the table spring 28 is set based on these various values so that the table body 10 does not unfold even if a force of 1G in the horizontal direction is exerted on the table body 10.

Note also that the main frame 22 and the sub frame 23 are not shown in FIG. 19 for the sake of simplicity.

In the present embodiment, if, when unfolding the table body 10 from the stowed position to the in-use position, the table body 10 is lifted to a predetermined position under 90 degrees relative to the vertical direction, the hemming crimp portions 23g of the sub frame 23 make contact with the dampers 33 as shown in FIG. 8. After the contact with the dampers 33, when the table body 10 is further lifted while compressing the dampers 33 and moved to a position that is approximately 90 degrees relative to the vertical direction (assuming that the angle of movement of the table is approximately 90 degrees), the upper surface of the pivoting member 35 that continues from and is orthogonal to the sliding surface 35g makes contact, as shown in FIG. 10, with the upper surface 32a of the engagement groove 32 in the retaining member 31, thus preventing the pivoting member 35 from moving upward. In this manner, the table body 10, or in other words, the table frame 20 is stopped from pivoting upward in the in-use position. Note that the speed of the lifting operation of the table body 10 is dampened by the sub frame 23 making contact with the dampers 33, which makes it possible to reduce loads on the various members caused by sudden manipulations.

When the upward movement of the pivoting member 35 stops at the location of the engagement groove 32, the pivoting member 35 pivots central to the shaft hole 35a in the direction of engagement with the engagement groove 32 due to the bias of the lock spring 36, and the engagement protrusion 35d enters into and engages with the engagement groove 32. The pivoting member 35 pivots until the contact surface 35f of the contact portion 35e makes contact with the retaining member 31, and the pivoting is stopped when contact is made with the retaining member 31. In other words, the contact portion 35e of the pivoting member 35 functions as a stopper that regulates the pivoting of the pivoting member 35. Accordingly, it is not necessary to provide an additional member to serve as a stopper, and a stopper that stops the pivoting of the table frame 20 can be provided with a simple configuration.

When the table body 10 is unfolded from the stowed position to the in-use position, the retaining member 31 and the pivoting member 35 engage and the lock 30 is locked, so that the table body 10 is held in the approximately horizontal position as shown in FIG. 4.

In this manner, with the table 1 described above, the lock 30 is provided at the position where the upper portion 41a located on the upper end of the arm 40 and the table frame 20 are linked, and the lock 30 is contained within the table body 10; thus when the table body 10 is in the approximately horizontal in-use position, there are no members, such as a lock mechanism or a link, exposed below the table body 10, as is the case with conventional tables. Accordingly, the space below the table body 10 can be used effectively.

Figure 20:
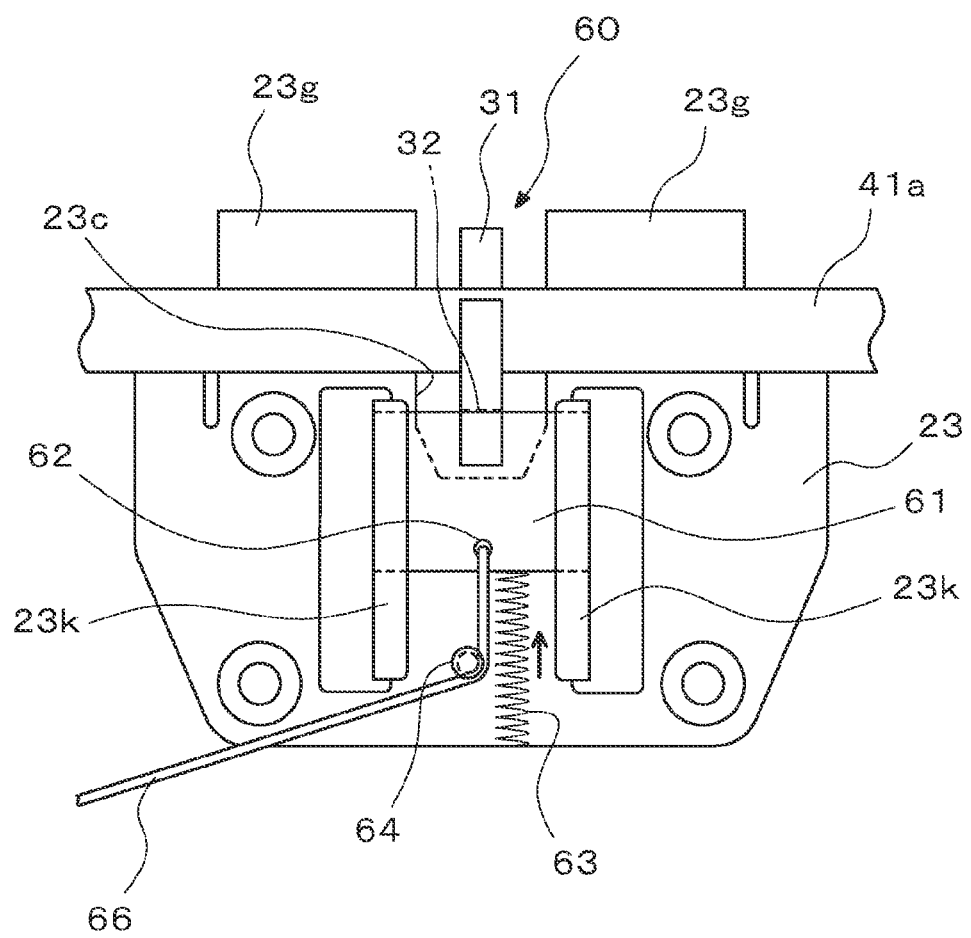
FIG. 20 is a pictorial diagram illustrating a lock according to another embodiment.
Figure 21:
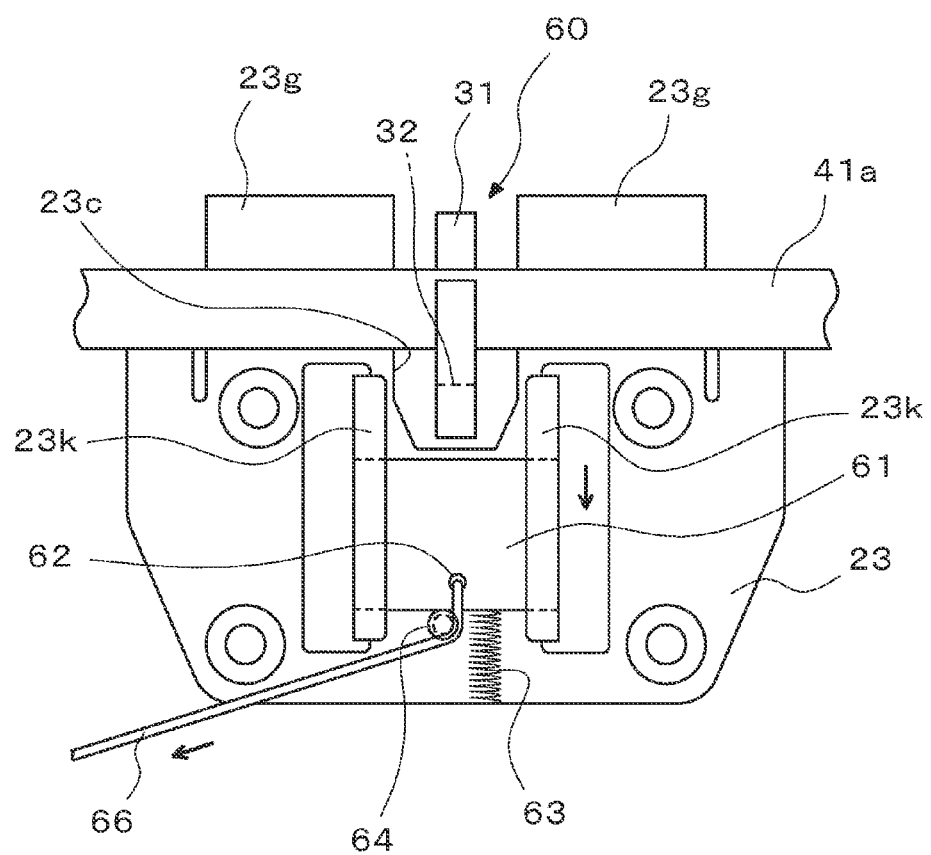
FIG. 21 is a pictorial diagram illustrating a lock according to another embodiment.
Figure 22:
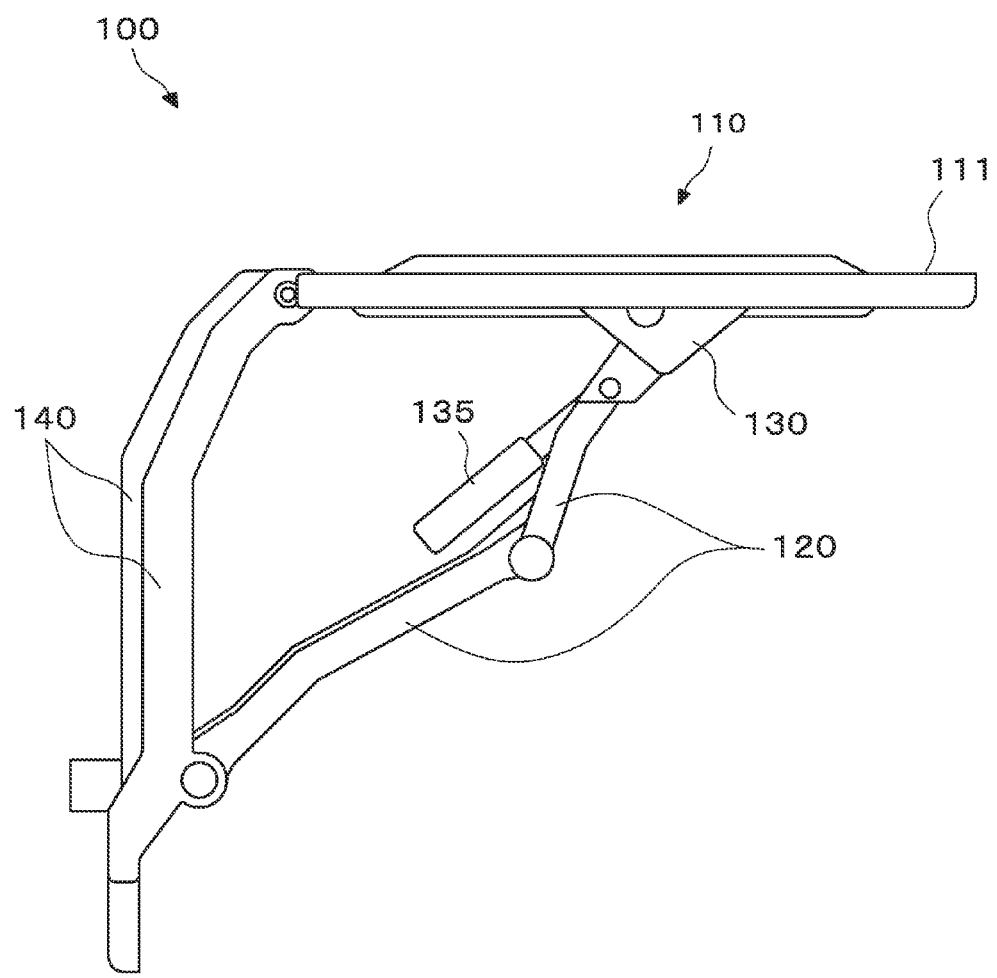
FIG. 22 is a side view of a conventional table frame and support member.

FIG. 20 and FIG. 21 illustrate another embodiment of the lock, and FIG. 20 and FIG. 21 are descriptive diagrams illustrating a lock according to another embodiment. Note that in the present embodiment, members, dispositions, and the like that are the same as in the aforementioned embodiment will be given the same reference numerals, and descriptions thereof will be omitted.

As shown in FIG. 20, a lock 60 according to the present embodiment is configured to include the retaining member 31 serving as the first engagement member, a sliding member 61 serving as the second engagement member, and a lock spring 63.

The sliding member 61 according to the present embodiment is formed from an approximately rectangular plate member having a predetermined thickness. Long, upright cut sections 23k, 23k that have been cut into an approximate L shape toward the central direction are formed in the sub frame 23 according to the present embodiment on the side of the sub frame 23 that faces the main frame 22, with two sections formed spanning the center in the direction orthogonal to the lengthwise direction of the upper portion 41a of the arm pipe 41. The upright cut sections 23k, 23k are formed so that the height of the inner sides of the bent portions thereof is slightly greater than the thickness of the sliding member 61, and the sliding member 61 is enclosed in the thickness direction and guided in a slidable state between the top surface of the bent portions and the sub frame 23. The configuration is such that when the sliding member 61 slides in the direction of the retaining member 31, one end thereof enters into and engages with the engagement groove 32 in an orthogonal direction to the retaining member 31.

A wire retaining hole 62 is formed in the sliding member 61 on the opposite side to the side that engages with the engagement groove 32. One end of a wire 66 is retained in the wire retaining hole 62 of the sliding member 61, whereas the other end is retained in the rod retaining hole 13c of the operating lever 13, thus linking the sliding member 61 and the operating lever 13. In addition, a rivet hole (not shown) is provided in the sub frame 23 on the outer side of the position of the wire retaining hole 62 when the sliding member 61 is disposed between the upright cut sections 23k, 23k, and a rivet 64 is inserted to the sub frame 23 and the main frame 22 through the rivet hole; the wire 66 is hooked onto the rivet 64, thus bending the direction in which the wire 66 extends.

The lock spring 63 according to the present embodiment is configured of a compressed coil spring; one end of the lock spring 63 makes contact with the sliding member 61, while the other end makes contact with and is retained by an inner surface of a bent portion 22a of the main frame 22 when the main frame 22 and the sub frame 23 are assembled together. In this manner, the lock spring 63 continually biases the sliding member 61 in the direction of the retaining member 31, or in other words, in the direction of engagement with the engagement groove 32.

When the operating lever 13 is manipulated and lifted in the same manner as in the previous embodiment, the wire 66 is pulled in the direction of the operating lever 13 (to the left, in FIG. 20); the sliding member 61 then moves in the state shown in FIG. 21 and exits the engagement groove 32 of the retaining member 31, and the retaining member 31 and the sliding member 61 disengage. When the retaining member 31 and the sliding member 61 disengage, or in other words, when the lock 60 is unlocked, the pulling force of the table spring 28 and torque generated by the weight of the table body 10 cause the table body 10 to begin to pivot downward central to the upper portion 41a of the arm pipe 41, thus starting the stowage, in the same manner as in the previous embodiment. In this manner, the same effects as the table 1 provided with the lock 30 according to the previous embodiment can be achieved even when the lock 60 according to the present embodiment is used.

Although the retaining member 31 that includes the engagement groove 32 and is anchored to the support member (arm 40) corresponds to the first engagement member, the pivoting member 35 or the sliding member 61 that are configured to be capable of engaging/disengaging with/from the engagement groove 32 corresponds to the second engagement member, and the second engagement member is configured to be movable in the aforementioned embodiments, it should be noted that the configurations of the first engagement member and the second engagement member are not limited thereto. For example, the configuration can be such that an engagement member on the side of the support member is movable and the engagement groove thereof is capable of engaging/disengaging with/from an engagement member on the side of the table frame. Alternatively, the configuration can be such that an engagement groove is provided in an engagement member that is movable on the side of the table frame, and an engagement member on the side of the support member is capable of engaging/disengaging with/from the engagement groove.

In addition, although the aforementioned embodiments describe examples in which the folding table 1 according to the present invention is disposed on a side of the vehicle seat S, the disposal and application of the folding table 1 according to the present invention is not limited thereto; the folding table 1 may be provided on the rear surface of a seat, the inner side of a vehicle door, a side surface of the vehicle body such as a side of a trunk, and so on. Note also that the vehicle is not limited to an automobile, and refers to any vehicle used for movement in which a seat can be mounted, including terrestrial transport vehicles having wheels such as trains, as well as aircraft, marine vessels, and so on that do not move over ground.

Furthermore, aside from vehicles, the support member can be attached to a side of a wall, a work cart, a counter, a cabinet, or the like.

As described thus far, by configuring the lock for holding the table body in the in-use position as described in the aforementioned embodiments, the folding table according to the present invention makes it possible to simplify the structure, reduce the number of components, make the folding table thinner, smaller, and lighter, and reduce the manufacturing cost thereof.

In addition, a space for unfolding members used in locking is unnecessary when switching between the in-use position and the stowed position, which ensures the locking during use and makes it possible to effectively use the space below the table.

Furthermore, because the structure of the base frame of the table can be made thinner, simplified, and the influence on designs thereof can be reduced, the general applicability of the base frame is expanded.

DESCRIPTION OF REFERENCE NUMERALS 1, 100 table (folding table)
10, 110 table body 11 upper cover
   11a putting-on surface
   11b recessed portion
   11c operating lever attachment recess
12 lower cover
13, 13S operating lever
   13a grip portion
   13b shaft hole
   13c rod retaining hole
14 lever rod
15 lever spring
   15a coil portion
16 lever shaft
20 table frame
21 pipe frame
   21a retaining portion
22 main frame
   22a bent portion
   22b, assembly recess
   23b
   22c, cutout portion
   23c
   22d, rivet hole
   22e,
   23d,
   23e
   22f, guidance groove
   23f
   22g, hemming crimp portion
   23g sub frame
23
   23k upright cut section
24, 64 rivet
25 reinforcing pipe
26 reinforcing bracket
27 retaining bracket
28 table spring (table biaser)
30, 60 lock
31 retaining member (first engagement member)
   31a sliding surface
   31b shaft hole
32 engagement groove
   32a upper surface
   32b lower surface
   32c groove bottom
33, 49 damper
34 shaft
35 pivoting member (second engagement member)
   35a shaft hole
   35b bulge portion
   35c lever retaining hole
   35d engagement protrusion
   35e contact portion
   35f contact surface
   35g sliding surface
36, 63 lock spring (lock biaser)
   36a coil portion
   36b, end
   36c
40, 140 arm (support member)
41 arm pipe
   41a upper portion
   41b side portion
   41c vertical portion
   41d sloped portion
   41e lower portion
43 arm bracket
   43a, attachment portion
   43b
44 bolt hole
45 reinforcing bead
47 damper bracket
48 damper pin
61 sliding member (second engagement member)
62 wire retaining hole
66 wire
111 top surface portion
120 link
130 lock mechanism
R seat riser
S vehicle seat
S1 seat back
S2 seating portion
S3 headrest
S4 arm rest

The invention claimed is:

1. A folding table capable of moving a table body between an in-use position and a stowed position, the folding table comprising:
a table frame that is disposed within the table body between upper and lower table body elements, and that supports the table body;
a support member that pivotably supports one end of the table frame; and
a lock that holds the table frame in the in-use position and prevents the table frame from pivoting, the lock being provided in an approximate center of a lengthwise direction of a position where the support member and the table frame are linked at a first end of the support member and a first end of the table frame;
wherein the lock includes:
a first engagement member in which an engagement groove is formed;
a second engagement member having an engagement protrusion capable of engaging with the engagement groove of the first engagement member by moving the engagement protrusion into an interference fit position with the engagement groove, and disengaging from the engagement groove of the first engagement member by moving the engagement protrusion out of an interference fit position with the engagement groove; and
a lock biaser;
wherein the first engagement member and the second engagement member are configured to be capable of engaging and disengaging by one of the first engagement member and the second engagement member being moved into, and respectively, away from, the interfering fit position by providing relative motion between the engagement groove and the engagement protrusion, and
the lock biaser biases the first or second engagement member that is moved in a direction of engagement.

2. The folding table according to claim 1, wherein the lock is contained within the table body.

3. The folding table according to claim 1, wherein:
the table frame includes an approximately plate-shaped main frame and an approximately plate-shaped sub frame that are assembled opposing each other; and at least part of the lock is held between the main frame and the sub frame.

4. The folding table according to claim 3, wherein:

the support member is formed of a pipe member; and the main frame and the sub frame are pivotably attached to the support member with the pipe member held between respective recesses of the main frame and the sub frame, and ends of the main frame and the sub frame on sides that hold the support member are linked using respective hemming crimp portions of the main frame and sub frame in a manner that the end of the sub frame is folded to wrap the end of the main frame.

5. The folding table according to claim 1, wherein:

the first engagement member and the second engagement member are configured of plate members;

the engagement groove is formed passing through a thickness direction of the first engagement member; and the second engagement member is inserted into and engages with the engagement groove to face in a direction orthogonal to the first engagement member.

6. The folding table according to claim 1, wherein:

the first engagement member has an arc-shaped sliding surface on an outer peripheral surface of the first engagement member;

an end of the second engagement member makes contact with and slides along the arc-shaped sliding surface of the first engagement member when the second engagement member exits the engagement groove;

the engagement groove has a pair of opposing inner wall surfaces and a groove bottom that connects the pair of inner wall surfaces; and a height from the groove bottom of the inner wall surface in the engagement groove on an opposite side to the arc-shaped sliding surface is formed to be greater than a height from the groove bottom of the inner wall surface on a side of the arc-shaped sliding surface.

7. The folding table according to claim 1, further comprising a table biaser having a first end in contact with the table frame and a second end engaged with a retaining bracket provided on the support member that biases the table frame in a direction of the stowed position.

* * * * *